US012613302B2

(12) United States Patent
Koshy et al.

(10) Patent No.: US 12,613,302 B2
(45) Date of Patent: Apr. 28, 2026

(54) SYSTEMS AND METHODS FOR ENHANCED ORIENTATION ACQUISITION AND TRACKING USING WIRELESS TECHNOLOGIES

(71) Applicant: ADEIA GUIDES INC., San Jose, CA (US)

(72) Inventors: Kamal J. Koshy, Aurora, CO (US); Dhananjay Lal, Englewood, CO (US)

(73) Assignee: ADEIA GUIDES INC., San Jose, CA (US)

( * ) Notice: Subject to any disclaimer, the term of this patent is extended or adjusted under 35 U.S.C. 154(b) by 143 days.

(21) Appl. No.: 18/201,832

(22) Filed: May 25, 2023

(65) Prior Publication Data

US 2024/0393422 A1    Nov. 28, 2024

(51) Int. Cl.
*G01S 5/02* (2010.01)
*A63F 13/216* (2014.01)
*G06T 11/00* (2006.01)

(52) U.S. Cl.
CPC .......... *G01S 5/0268* (2013.01); *G01S 5/0284* (2013.01); *G06T 11/00* (2013.01); *A63F 13/216* (2014.09)

(58) Field of Classification Search
None
See application file for complete search history.

(56) References Cited

U.S. PATENT DOCUMENTS

| | | | |
|---|---|---|---|
| 10,693,576 B2 | 6/2020 | Blokh et al. | |
| 10,791,536 B1 * | 9/2020 | Murphy | G06Q 50/40 |

| | | | |
|---|---|---|---|
| 10,830,592 B2 | 11/2020 | Koshy et al. | |
| 2018/0364048 A1 * | 12/2018 | Cook | G06F 3/0346 |
| 2019/0038362 A1 * | 2/2019 | Nash | A61B 90/36 |
| 2019/0253667 A1 * | 8/2019 | Valli | H04N 13/243 |
| 2020/0025911 A1 * | 1/2020 | Rappaport | H01Q 3/26 |
| 2020/0229125 A1 * | 7/2020 | Manolakos | H04L 5/0048 |
| 2020/0309944 A1 * | 10/2020 | Thoresen | G06T 19/006 |
| 2021/0049360 A1 * | 2/2021 | Yildiz | G02B 27/017 |

(Continued)

OTHER PUBLICATIONS

Advantages and Disadvantages of LiDAR, LiDAR and RADAR Information, available online at: <https://lidarradar.com/>, retrieved on Mar. 19, 2025, 7 pages.

(Continued)

*Primary Examiner* — Jason A Pringle-Parker
(74) *Attorney, Agent, or Firm* — HG LAW LLP

(57) ABSTRACT

Systems and methods for determining relative position and orientation between users of an augmented or mixed reality environment are disclosed. Devices associated with different users that are close in proximity to each other are segmented in a same cluster. LOS and nLOS signals received by the device are distinguished, and LOS signals are used to determine relative position/orientation of the device segmented in the same cluster. The LOS signal (and its factors, such as direction, time of flight) received by the device is used to determine relative position of the device. An angle of arrival of the LOS signal is used to determine the device's relative orientation. Peer-to-peer packet exchanges and the angles of their arrival are also used to determine relative position and orientation between users. The determined relative position and orientation are used to render virtual objects that are anchored to an electronic device.

20 Claims, 17 Drawing Sheets

(56) References Cited

U.S. PATENT DOCUMENTS

2022/0011577 A1* 1/2022 Lawver .............. G02B 27/0101

OTHER PUBLICATIONS

Behboodi, A., et al., "Bringing AI research to wireless communication and sensing [video]", Qualcomm, available online at: <https://www.qualcomm.com/news/onq/2022/05/bringing-ai-research-to-wireless-communication-and-sensing>, May 25, 2022, 4 pages.

Christ, A., "Reflection Properties of the Human Skin From 40 to 110 GHz: A Confirmation Study", Bio Electro Magnetics, vol. 42, No. 7, Oct. 2021, pp. 562-574.

Dwivedi, S., et al., "5G positioning: What you need to know", Ericsson, available online at: <https://www.ericsson.com/en/blog/2020/12/5g-positioning--what-you-need-to-know>, Dec. 18, 2020, 9 pages.

Gapeyenko, M., et al., "Standardization of Extended Reality (XR) over 5G and 5G-Advanced 3GPP New Radio", arXiv:2203.02242v3 [cs.NI], May 29, 2023, 7 pages.

Kanhere, O., et al., "Position Location for Futuristic Cellular Communications: 5G and Beyond", IEEE Communications Magazine, vol. 59, No. 1, Jan. 1, 2021, pp. 70-75.

Karmanov, I., et al., "WiCluster: Passive Indoor 2D/3D Positioning using WiFi without Precise Labels", arXiv:2107.01002, May 2021, 7 pages.

Lau, S. L., et al., "Novel indoor localisation using an unsupervised Wi-Fi signal clustering method", 2011 Future Network & Mobile Summit, Jun. 2011, 9 pages.

Li, X., et al., "NLOS identification and mitigation based on channel state information for indoor WiFi localisation", IET Communications, vol. 11, No. 4, Mar. 1, 2017, 7 pages.

Markerless inside-out tracking, "Welcome to XinReality: Virtual Reality and Augmented Reality Wiki", VR AR & XR Wiki, available online at: <https://xinreality.com/wiki/Main_Page>, Dec. 25, 2023, 2 pages.

Scient Direct (Registered), "Sounding Channel", Computer Science, available online at: <https://www.sciencedirect.com/topics/computer-science/sounding-channel>, 2011, 10 pages.

The Verge, "iOS 12 multiplayer AR gaming first look", avaialbe online at: <https://www.youtube.com/watch?v=jD8Z1nhcldY>, Jun. 5, 2018, 158 pages.

Video shows vision of large scale outdoor 5G multiplayer with multiple AR players at the same time, available online at: <https://newsbeezer.com/austriaeng/video-shows-vision-of-large-scale-outdoor-5g-multiplayer-with-multiple-ar-players-at-the-same-time/>, Apr. 2, 2021, 3 pages.

* cited by examiner

Rendering based on relative orientation

Rendering without relative orientation (virtual object floating)

300

600

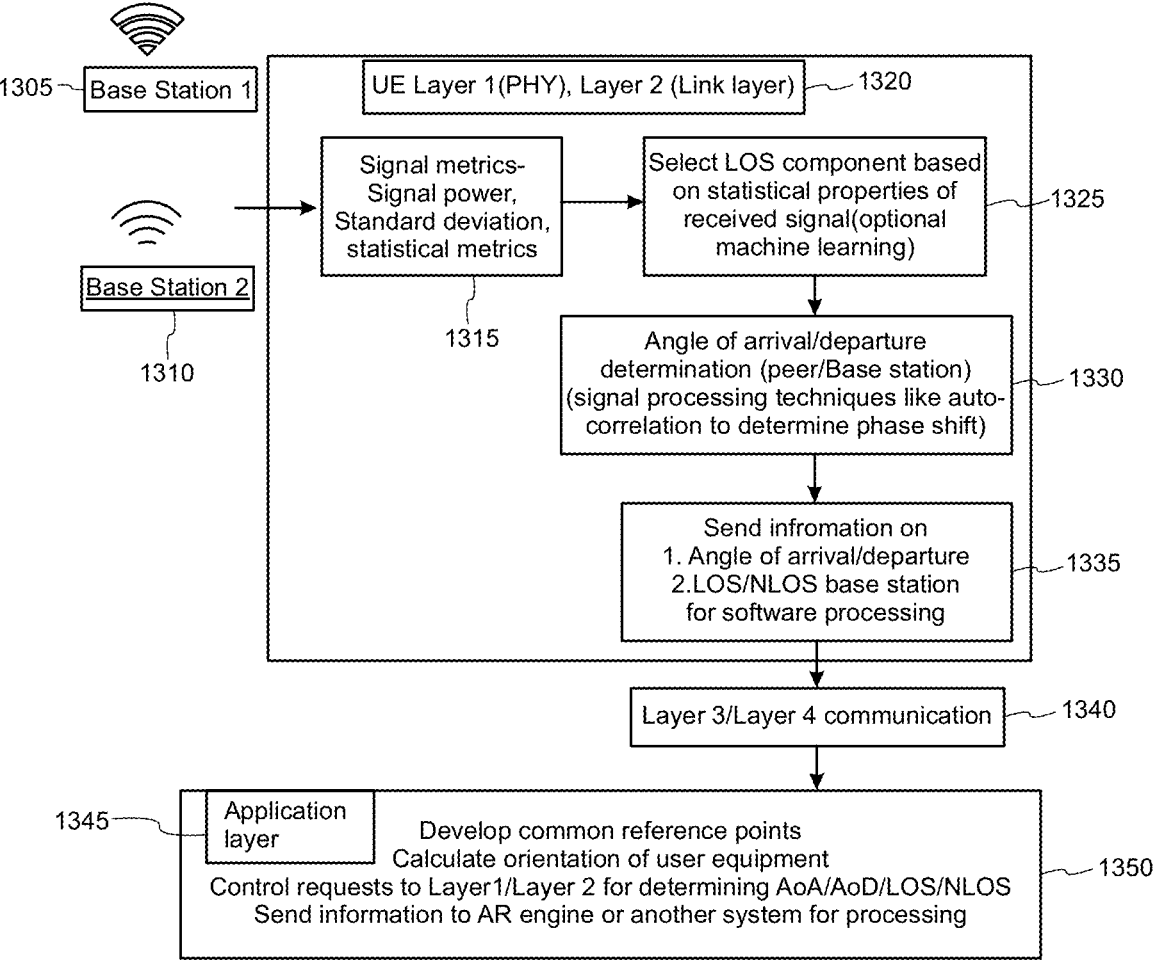

1305 — Base Station 1

Base Station 2

1310

UE Layer 1(PHY), Layer 2 (Link layer) — 1320

Signal metrics-
Signal power,
Standard deviation,
statistical metrics

1315

Select LOS component based
on statistical properties of
received signal(optional
machine learning) — 1325

Angle of arrival/departure
determination (peer/Base station)
(signal processing techniques like auto-
correlation to determine phase shift) — 1330

Send infromation on
1. Angle of arrival/departure
2.LOS/NLOS base station
for software processing — 1335

Layer 3/Layer 4 communication — 1340

1345 — Application
layer

Develop common reference points
Calculate orientation of user equipment
Control requests to Layer1/Layer 2 for determining AoA/AoD/LOS/NLOS
Send information to AR engine or another system for processing — 1350

1516 — MICROPHONE

1514 — SPEAKERS

1512 — DISPLAY

1510 — USER INPUT INTERFACE

1504

1506 — PROCESSING CIRCUITRY

1508 — STORAGE (E.G., RAM, ROM, HARD DISK, REMOVABLE DISK, ETC.)

1502

SYSTEMS AND METHODS FOR ENHANCED ORIENTATION ACQUISITION AND TRACKING USING WIRELESS TECHNOLOGIES

FIELD OF DISCLOSURE

Embodiments of the present disclosure relate to determining relative position and orientation between users of an augmented or mixed reality environment, and to using the relative position and orientation to determine placement of virtual objects in the augmented or mixed reality environment.

BACKGROUND

A variety of augmented reality (AR) experiences and games are currently available in the market for users to download and experience. These experiences vary from single user experiences to multi-user experiences in which multiple users may play a game together or interact in the augmented reality environment. To engage in such experiences and games, users typically wear an AR/VR headset, which allows them to view the area surrounding them as well as objects that are augmented over the surroundings, such as an augmented virtual object over real-life surroundings.

These AR/VR headsets depend on positional tracking for to provide users immersion into their physical environment. Understanding position and orientation of each participant in such a multi-user AR environment is important for placing of objects within the virtual space and rendering them accurately for all users in a multiuser experience.

While there are some technologies that are used for positional and rotational tracking for AR/VR headsets, they either do not efficiently determine the position and rotation of the virtual objects or require cumbersome steps to perform positional and rotational tracking. For example, some methods that attempt to provide positional and rotational tracking include outside-in tracking and inside-out tracking. Outside-in tracking depends on sensors in the physical world, and the relative position and orientation of the HMD is tracked with respect to outside sensors. The drawback of outside-in tracking is the requirement to retrofit the physical world with sensors that can provide information about the headset.

Inside-out tracking is applicable in certain situations but may not be applicable in other situations. Inside-out tracking uses sensors within the HMD to track the outside world. It may also use known markers in the physical world, and when known markers are not available, or in the case of marker less inside-out tracking, natural features in the environment, such as a tree in a park, may be used. Inside-out tracking uses multiple technologies including image segmentation, light detection and ranging (LiDAR), inertial sensors' measurement (accelerometers, gyroscopes, vibration sensors, etc.) to understand and mark the environment and determine the headset position/orientation in relation to the marked environment.

Some inside-out tracking devices use visible light cameras. Such devices depend on image segmentation and processing and rely on the lighting conditions to detect the environment (when used with marker less inside-out tracking). In cloudy and rainy conditions, inside-out tracking devices that use such visible light cameras may not be as efficient, or the results may be skewed due to the weather conditions.

Technologies that use LiDAR may work in many situations but have limitations when working in environments without many distinguishing physical features. In addition, use of LiDAR in multi-player scenarios may require a common reference point. In multi-player scenarios, use of LiDAR technologies requires the rationalization of markers in the physical world between the two users to enable the multiple users to interact in the same physical world.

As such, there is a desire for an alternative method that serves as a fallback in scenarios where some of the existing methods are not applicable.

BRIEF DESCRIPTION OF THE FIGURES

The various objects and advantages of the disclosure will be apparent upon consideration of the following detailed description, taken in conjunction with the accompanying drawings, in which like reference characters refer to like parts throughout, and in which:

FIG. 13 is an example of processes for determining relative orientation and Open Systems Interconnection (OSI) layers used to perform the processes, in accordance with some embodiments of the disclosure;

DETAILED DESCRIPTION

Figure 1:
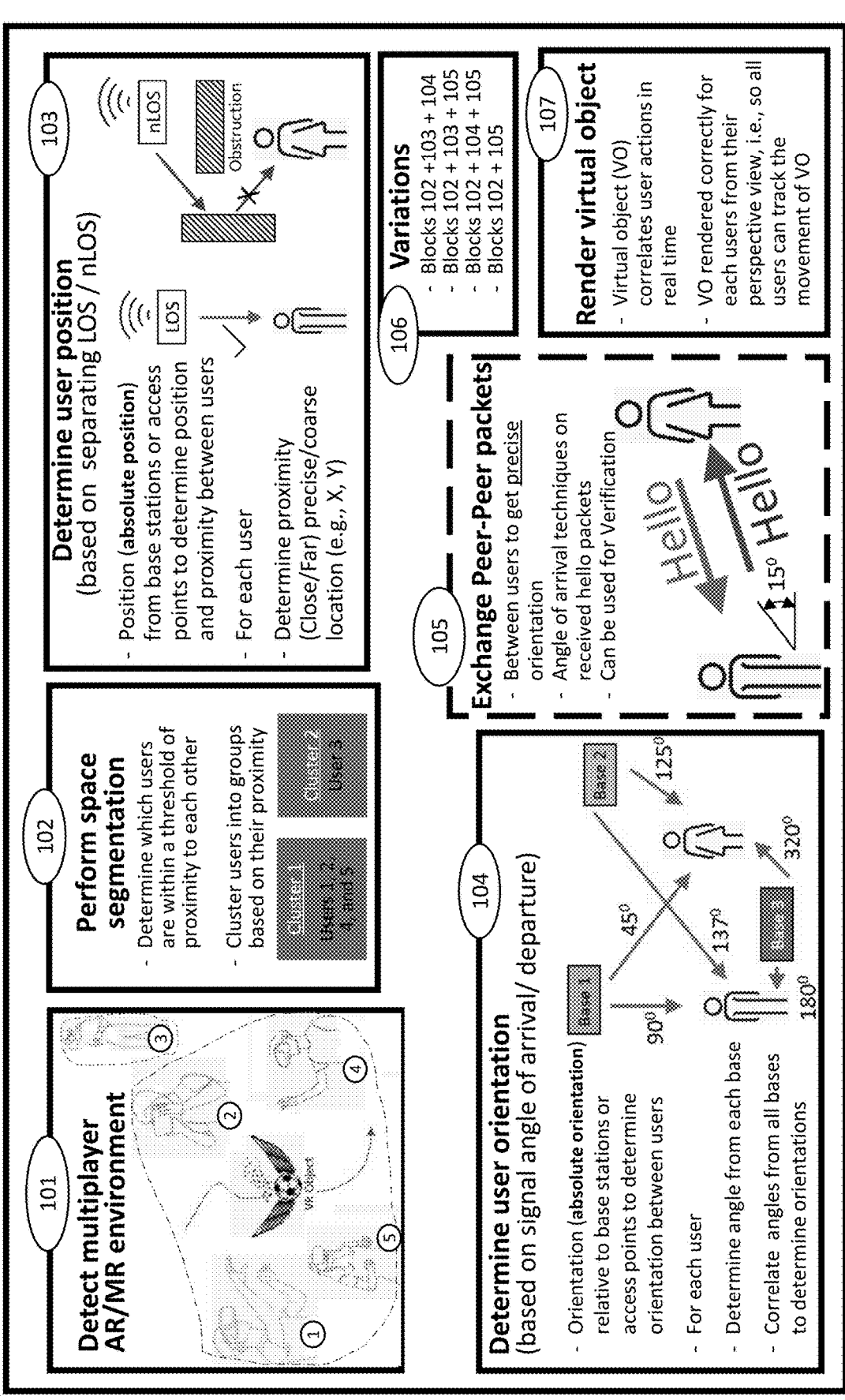
FIG. 1 is a block diagram of an example of a process for determining relative orientation between users in a multi-player AR/MR environment, in accordance with some embodiments of the disclosure.

In accordance with some embodiments disclosed herein, some of the above-mentioned limitations are overcome by determining relative position and orientation between electronic devices associated with users of an augmented or mixed reality environment. Techniques used include space segmentation, determination of absolute and relative position of the electronic device, determination of absolute and relative orientation of the electronic device, verification of orientation and position via determining angle of arrival and/or angle of departure of peer-to-peer packets and rendering of virtual objects that are anchored to the electronic device based on the determined relative position and orientation.

In some embodiments, systems and methods are disclosed for performing space segmentation of electronic devices. The methods determine which electronic devices are within a threshold proximity of each other and cluster those electronic devices into a same cluster group (or same space segmentation group). Sharing of common wireless parameters between the electronic devices, such as similar wireless signal strength for a signal transmitted by a common base station to each electronic device, is one of the indicators that the electronic devices are in close proximity to each other. Such indicators are used to cluster electronic devices with common wireless parameters into a same cluster group.

The methods also distinguish between line of sight (LOS) and non-line of sight (nLOS) wireless signals from a base station (or access point) to a receiver. The methods select LOS signals from the base station to determine both position and orientation of the electronic devices that have been segmented together in the same cluster group. Since nLOS wireless signals have several reflective components and do not allow accurate determination of position and orientation, LOS signals, which typically have far fewer reflective components and a dominant component, may be used instead. Using LOS signals, the methods are performed to determine absolute position of the electronic devices that are within the same cluster group.

The methods are also used to measure angles of arrival of a wireless signal transmitted from a common base station to the electronic devices associated with different users that are within the same space segmentation or cluster group. Based on the angle of arrival, the methods are used to determine the orientation of each electronic device.

In some embodiments, optionally, although position and orientation may be determined based on the LOS signals as described above, the methods may perform a verification check by analyzing peer-to-peer packets exchanged between two devices in the same cluster. The analysis may include determining the angle of arrival of a hello packet sent from one user's electronic device to another user's electronic device.

In some embodiments, instead of determining position and orientations based on analysis of LOS signals, the methods may perform space segmentation and then analyze peer-to-peer packets exchanged between two devices in the same cluster. The analysis, as described above, may include determining the angle of arrival of a hello packet sent from one user to another user's electronic device. Various combinations on how position and orientation may be determined are described in further detail below.

In some embodiments, in an initial phase, a determination is made of which devices are in close proximity to each other. Based on the determination, devices that are close to each other, e.g., within a predetermined proximity, may be clustered together. Once space segmentation is performed and position and orientation are determined (by any of the methods described above) for the initial phase, for a maintenance phase, a phase in which a determination may be made to continuously check and update relative orientation as needed, the methods may only require determining the angle of arrival of a hello packet sent from one user to another user's electronic device to determine current orientation.

The determined relative position and orientation may be used to render virtual objects accurately such that they are viewed correctly from the perspectives of all users in the cluster.

FIG. 1 is a block diagram of an example of a process for determining relative orientation between users in a multi-player AR/MR environment, in accordance with some embodiments of the disclosure.

Determining position and relative orientation of each participant in an AR/MR environment is important for placing virtual objects within the virtual space and rendering them accurately for all users in a multiuser experience. The determining of position, and more specifically relative orientation, allows rendering of any virtual assets associated with a second user in a perspective-accurate manner for a first user. For example, in a multiplayer AR game, users may launch moving objects, such as a virtual projectile like an arrow, while in a specific orientation. Having the data related to the position and relative orientation of users, to whom the arrow is anchored, allows the systems to calculate in a perspective-accurate manner for all users the trajectory of this arrow, whether or not they have in their view the user who launched the arrow.

The process of FIG. 1, in some embodiments, utilizes various techniques and mechanisms to enhance position accuracy, orientation accuracy and multi-player collaboration using wireless technology characteristics. These techniques and mechanisms provide precise (or within a margin of error) relative orientation between users, which allows accurate tracking or moving virtual objects.

Figure 2A:
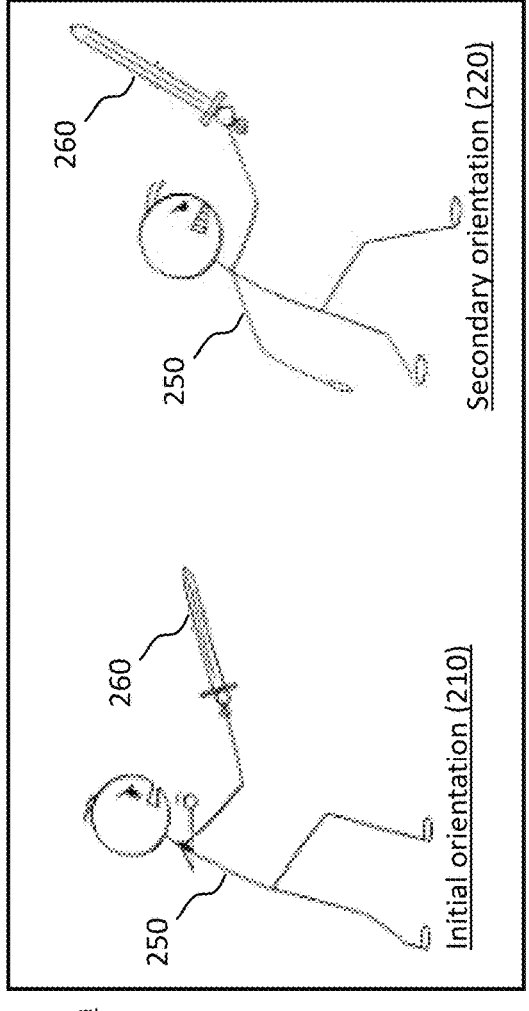
FIG. 2A is an example of an accurate rendering of a virtual object in an AR/MR environment, where the rendering is based on using obtained relative orientation between the users, in accordance with some embodiments of the disclosure.
Figure 2B:
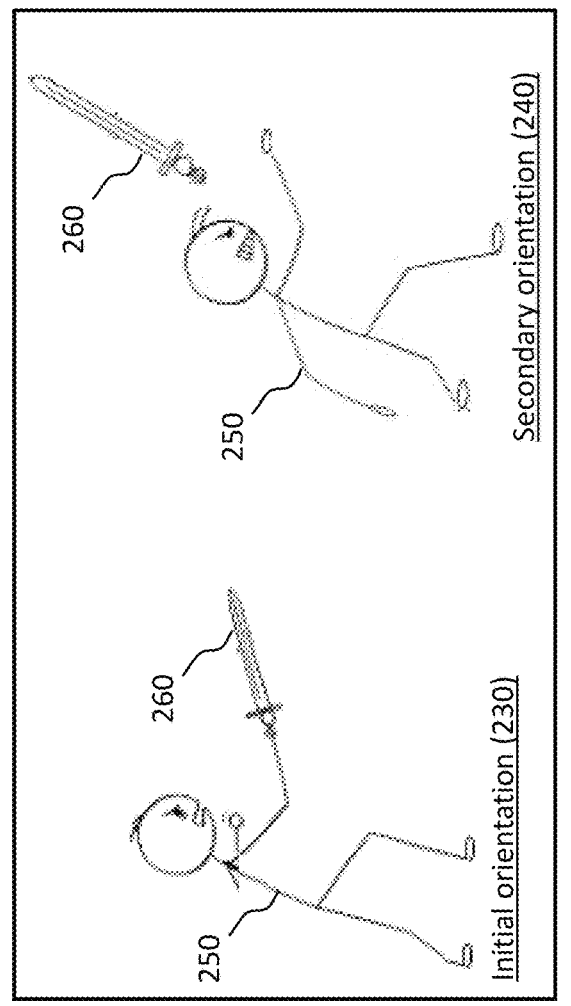
FIG. 2B is an example of an inaccurate rendering a virtual object in an AR/MR environment, where the rendering is performed without the determination of relative orientation between the users, in accordance with some embodiments of the disclosure.

For example, as depicted in FIGS. 2A and 2B, a first user 250 is holding a virtual sword 260 as the first user 250 maneuvers from their initial orientation 210 to a secondary orientation 220. Since the sword 260 is a virtual object anchored to the first user 250, the process of FIG. 1, in some embodiments, allows the systems to determine the first user's relative orientation with respect to a second user (not shown in the figure) who is proximate to the first user. Determining the relative orientation allows the systems to render the sword 260 accurately for both the first and the second user in their AR/MR headsets as the first user maneuvers from initial 210 to secondary 220 orientation, as depicted in FIG. 2A. Without such accurate relative orientation between users, anchoring of the sword 260 to the person may not be accurately performed, and as such the sword in FIG. 2B may be shown as detached from the person 250 at the secondary orientation 240.

Figure 2C:
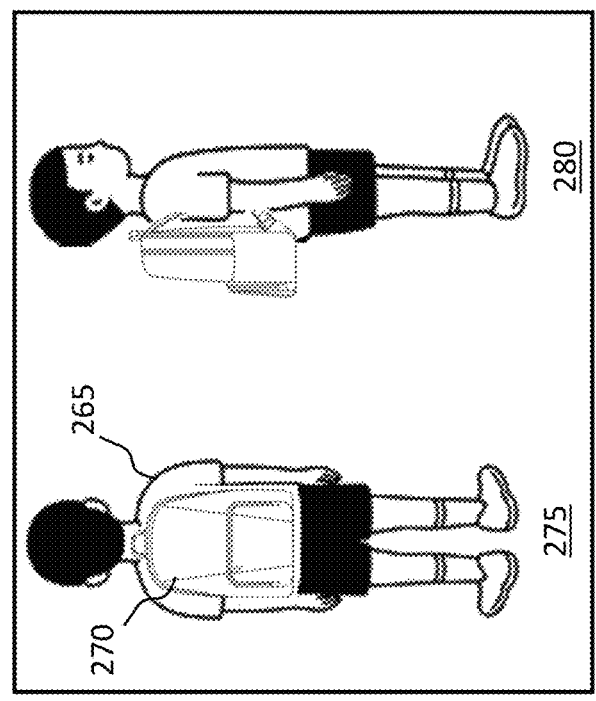
FIG. 2C is an example of an accurate rendering a virtual object (backpack) anchored to a person in an AR/MR environment, where the rendering is performed with the determination of relative orientation between the users, in accordance with some embodiments of the disclosure.
Figure 2D:
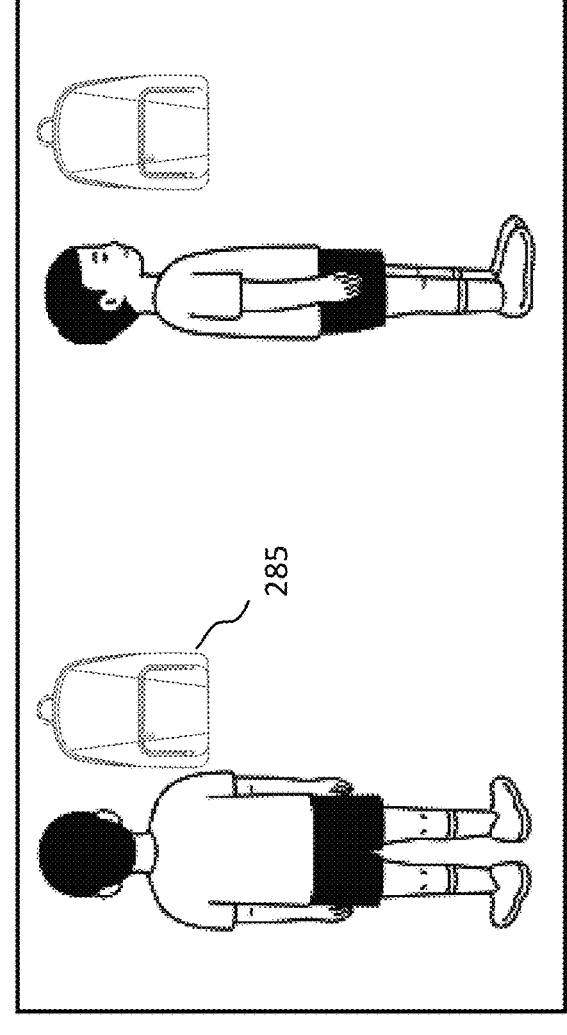
FIG. 2D is an example of representing the backpack as a floating object, which is typically performed with current technologies, in accordance with some embodiments of the disclosure.

In another example, as depicted in FIGS. 2C and 2D, a child 265 is shown with a virtual object 270, which is a backpack. In FIG. 2C, relative position and orientation are obtained and used to accurately depict the backpack 270 anchored with respect to the child's back. In other words, if child faces back 275, side 280, front, or is oriented in any direction, from the perspective of a second user looking at the child, the backpack 270 will be accurately depicted as anchored to the child's back, as depicted in FIG. 2C. However, systems that do not have such accurate relative orientation and position data may not to be able to precisely, or consistently, anchor the backpack 270 to the child 265, and the backpack may instead be depicted as a floating object 285 shown in FIG. 2D. This is because anchoring the backpack to the child's back without having accurate relative orientation and position results in inaccurate or inconsistent rendering of the backpack.

The process of FIG. 1 is described in further detail in blocks 101-107, and FIGS. 2-13 are used to describe processes, functions, and examples of embodiments described in each block. The process of FIG. 1 is, in some embodiments, performed using the systems and devices described in FIGS. 14 and 15.

Figure 14:
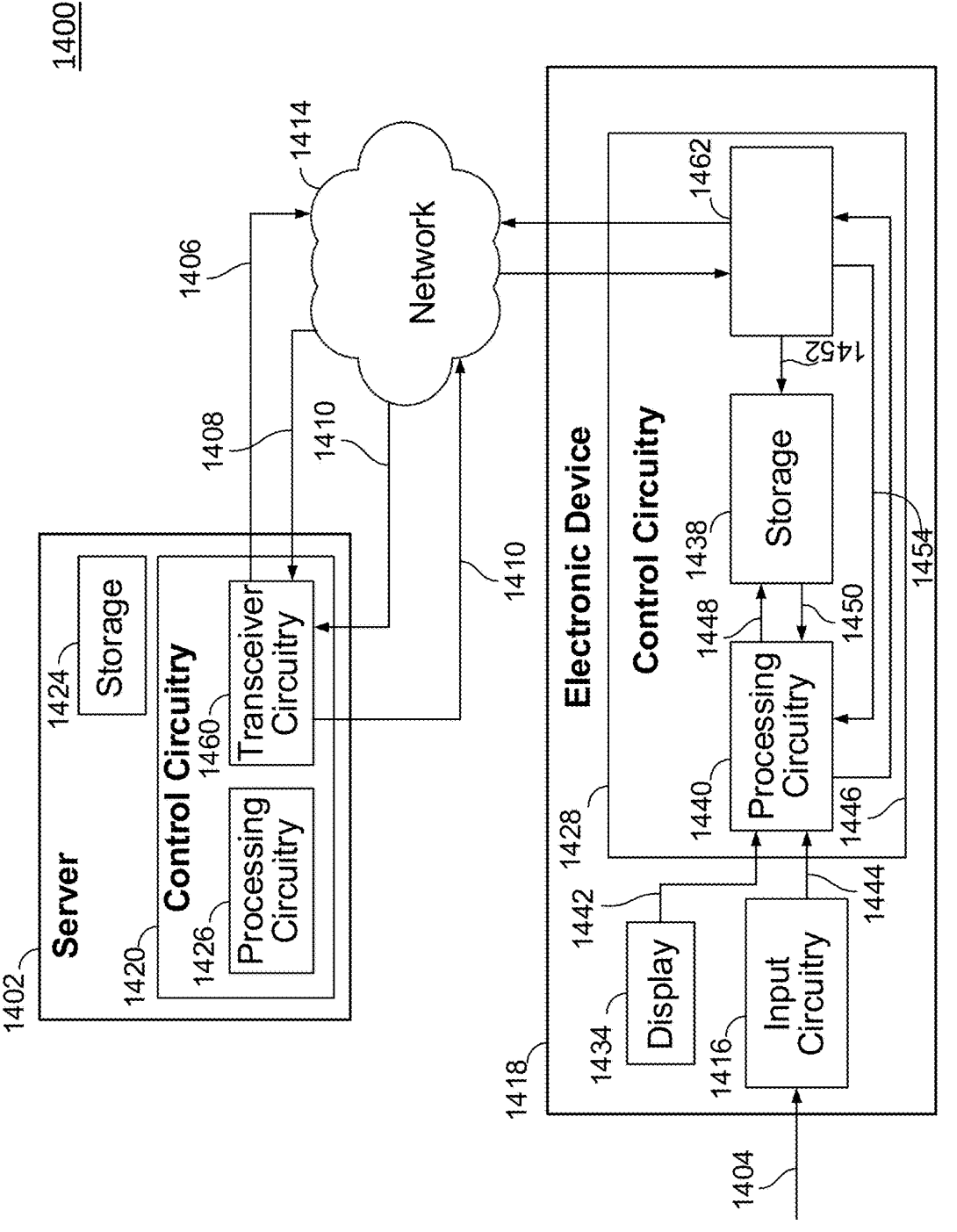
FIG. 14 is a block diagram of an example system for determining relative position and orientation between users in an AR/MR environment, in accordance with some embodiments of the disclosure.

Referring to block 101 of FIG. 1, the control circuitry of a system, such as control circuitry 1420 and/or 1428 of system 1400 depicted in FIG. 14, detects multiple users engaged with each other in a multi-user or a multi-player AR/MR environment. The control circuitry 1420 and/or 1428 of system 1400 may make such a detection based on the multiple users, via their electronic devices, engaging with or connecting to the multi-user or a multi-player AR/MR environment, such as, for example, downloading the same AR/MR application and entering an AR/MR virtual game. References to a user when referring to the user's position and orientation are meant to include the electronic device associated with the user, e.g., position and orientation of the electronic device used by the user during the AR/MR experience.

In some embodiments, the user may be using the portable electronic device while engaged with the AR/MR environment. The portable device may be a mixed reality (MR) or augmented reality (AR) device that includes a camera and a display to obtain and display virtual objects, such as the airborne flying VR object depicted in block 101. As used herein, the terms extended reality, AR, MR and XR, are used interchangeably to cover all instances of augmented reality and mixed reality devices, applications, and environments, and may also be collectively referred to as XR.

The XR device used in block 101 may be a headset, such as an augmented reality or mixed reality headset, that is worn by the users, such as users 1-5. The XR headset may be a head-mounted XR device. It may be a device that can be worn by a user by wrapping around their head, or some portion of their head, and in some instances, it may encompass the head and the eyes of the user. It may allow the user to view both real-life objects, such as a physical object in the real world, and virtual objects in the augmented reality world, such as the airborne flying VR object depicted in block 101. The XR device may also include a display that may allow the user to see objects that do not exist in the real or physical world and exist only in a virtual world, again, such as the airborne flying VR object depicted in block 101. The XR device may also be an augmented or mixed reality device that can be used for a plurality of use cases, such as for playing multi-player games in an AR/MR environment that involves both the physical and augmented worlds, e.g., airborne flying VR object depicted in block 101 overlayed or displayed over real-life objects.

In some embodiments, the XR device may be a non-headset device. For example, the XR device may be a wearable device, such as smart glasses with control circuitry 1420 and/or 1428, that allows the user to see through a transparent glass to view a virtual object, such as the airborne flying object depicted in block 101, as it moves from location to location. Such see-through functionality may be an optical or a video see-through functionality. In other embodiments, the XR device may be a mobile phone having a camera and a display to intake the live feed input and display it on a display screen of the mobile device. The devices mentioned may, in some embodiments, include both a front-facing (or inward-facing) camera and an outward-facing camera. The outward-facing camera may capture the live images and augment the airborne flying object depicted in block 101 over the live images. The devices mentioned above, such as smart glasses, mobile phones, AR/MR headsets, and the like, for the sake of simplification, are herein referred to as extended reality devices, XR devices, or extended reality headsets.

In some embodiments, the XR device may also include an inertial measuring unit (IMU), a gyroscope, an accelerometer, a camera, and/or other sensors, such as motion sensors. Such components may be within the XR device or wirelessly connected to the XR device. These components may be used by the process of FIG. 1 in combination with the techniques and mechanisms described in blocks 101-107 to determine location and relative orientation of the XR device.

In some embodiments, the users in the AR/MR environment may orient (e.g., rotate or tilt their head) without transitional movement. For example, changes in orientation with little or no lateral movement may occur when a person is seated in a chair and rotates their head while wearing an AR/MR headset, or moves their hands and head, such as when moving a virtual sword, without walking or moving laterally across a room. In other embodiments, the users may be moving both laterally and rotating where movement in all six degrees of freedom (6DOF) is possible. This may include rotation and navigation in both vertical and horizontal directions. For example, to catch a golden snitch in a game of quidditch, the user may jump and rotate in air, run across a field, or, as depicted in a Harry Potter™ movie, fly their broomstick to hit the golden snitch into a virtual goal.

In some embodiments, other XR experiences may require the user to perform several movements or transitions from one place to another. For example, a user may need to look all around, 360°, to catch the airborne flying object depicted in block 101, battle another user using their virtual sword as depicted in FIGS. 2A and 2B, or walk around with a virtual backpack as depicted in FIGS. 2C and 2D. In such situations, relative orientation is critical for rendering the virtual object accurately from perspectives of all users in the game.

In some embodiments, as depicted in block 101, there may be a number of users in the multi-player or multi-user environment. In this example, there are five users depicted in block 101. The control circuitry 1420 and/or 1428 of system 1400 (FIG. 14) may detect the five players engaged with the multi-player environment in several ways. In one embodiment, the five players may activate an application that may trigger the start of process described in FIG. 1. In another embodiment, a server that stores a gaming application may receive requests from multiple users requesting to play the game in a multi-player environment, and the server may activate the process of FIG. 1. Regardless of how the detection at block 101 is made, once a determination is made that multiple users are engaged in, or wish to engage in, a multi-user or multi-player AR environment that includes virtual objects, the process of FIG. 1 may be deployed by the control circuitry 1420 and/or 1428.

At block 102, the control circuitry 1420 and/or 1428 may perform space segmentation. Space segmentation, in some embodiments, is the clustering of those users that are in close proximity, e.g., within a predetermined threshold proximity or distance, of each other. Although reference is made to users, segmentation is meant also for the segmentation of electronic devices that are associated with the users. In addition to being close in distance, clustering is also a grouping of those users whose electronic devices exhibit similarities in wireless channel state information (CSI). As referred to herein, CSI is a wireless communication terminology that refers to channel properties of a communication link. These properties allow a system to determine parameters of a wireless signal that propagates from the transmitter (such as a base station or access point) to the receiver (the user's electronic device). Since CSI is different for different devices due to several factors, such as the device's location, CSI for each device will have a unique signature driven by different wireless parameters. Additional details of clustering based on the CSI matrix are described in the description related to FIGS. 6A-8.

To perform space segmentation, the control circuitry uses wireless clustering techniques to enhance AR/VR, or other experiences, where different users within a proximity of each other are validated or grouped. In some embodiments, local area technologies, including wireless local area network (WLAN), are used to perform such groupings. Among the several benefits of this technique include an ability to understand whether users in multi-player environments can play or interact with each other. Segmentation also sets a baseline for image segmentation (or LiDAR or similar techniques) to explore within a smaller space of related users, e.g., within the same cluster, instead of all users at a location. Having grouped users in close proximity also allows the control circuitry to determine relative orientation between users using hello packets, as will be described further in block 105.

As depicted in block 102, users 1, 2, 4, and 5 have been clustered in Cluster 1 (which may also be referred to as Group 1), and user 3 has been clustered in Cluster 2 (which may also be referred to as Group 2). Although a certain number of users are depicted in each cluster, the number of users can vary. The clustering is performed based on close proximity of devices and similarity of wireless parameters. If one set of devices are at a location that is close to each other, then they are clustered together. If another set of devices are at a second location and close to each other, then they are clustered together as a separate group. If the devices are not close to each other, or close to each other but separated by physical means, such as walls and other obstructions, then such devices may not be clustered together. Likewise, devices, users, or their avatars that are separated in the virtual world by virtual obstructions, such as virtual wall, may also not be clustered together.

The details of space segmentation and clustering of block 102 are described in further detail below in relation to FIGS. 3-8.

Figure 3:
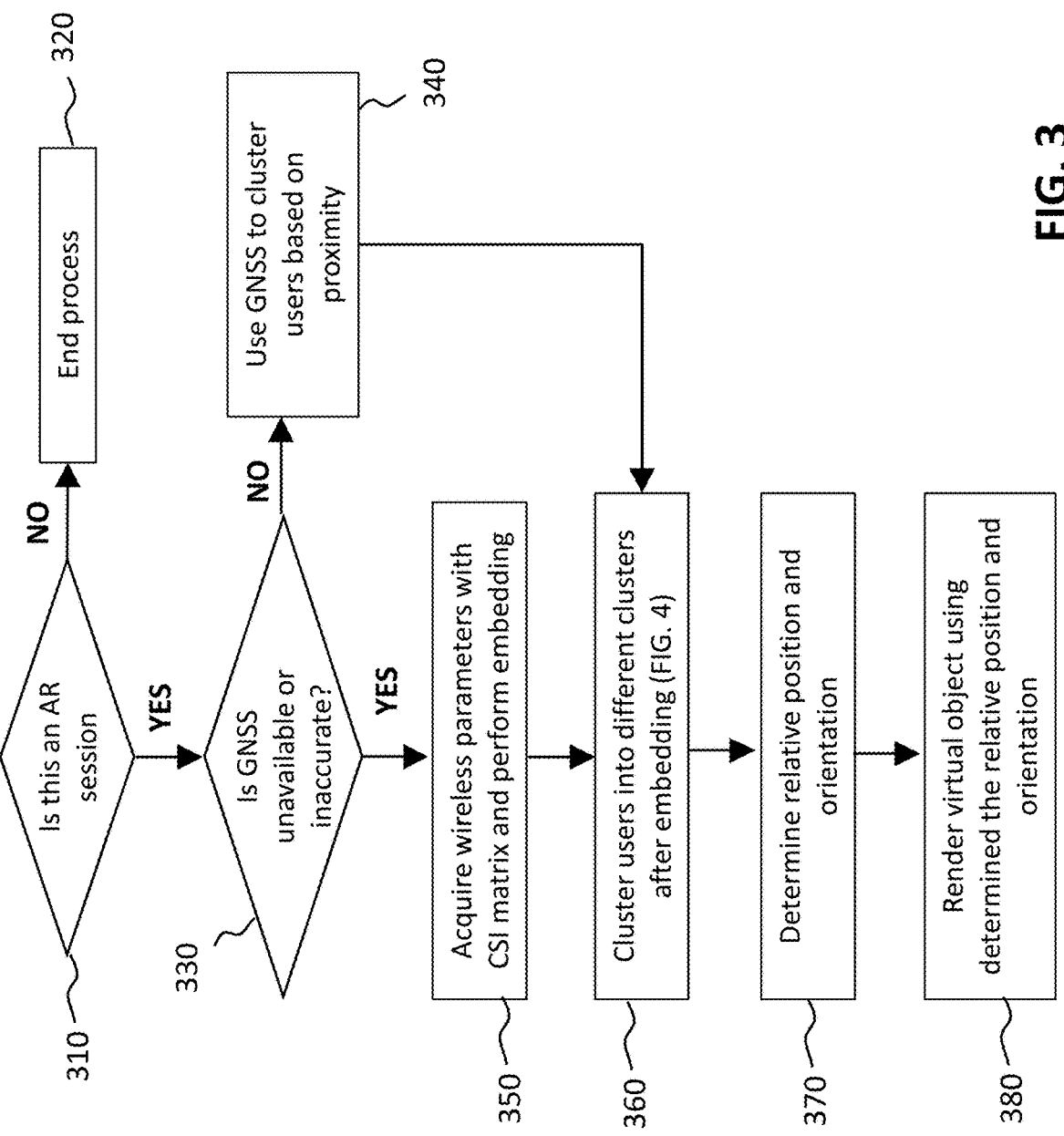
FIG. 3 is a flowchart of a process for performing space segmentation using wireless parameters, in accordance with some embodiments of the disclosure.

FIG. 3 is a flowchart of a process for performing space segmentation using wireless parameters. As depicted in FIG. 3, control circuitry 1420 and/or 1428 at block 310 determines whether the session is an augmented reality (AR) session. The determination may be made, for example, based on detecting that an augmented reality mode is enabled in an AR headset. The determination may also be made based on detecting that the user has signed-in to an AR game or an AR experience. The AR application running on the headset used by the user may also signal that the user has entered an AR environment.

If a determination is made at block 310 that the session is not an AR session, then at block 320, the control circuitry 1420 and/or 1428 may end the process 300. The control circuitry 1420 and/or 1428, in some embodiments, may also signal to the user or other systems and components that the process to perform space segmentation will not be initiated since it is not an AR session.

If a determination is made at block 310 that the session is an AR session, then, at block 330, the control circuitry 1420 and/or 1428 may perform another determination to determine whether GNSS is either unavailable or inaccurate at the location where the electronic device used to engage in the AR session is located. GNSS, which stands for global navigation satellite system, is a system that uses a group of satellites in orbit, which may be placed in a manner to generate positioning, timing, and navigation data from space and relay them to devices on land that can utilize such data. GNSS may also be protocols such as GPS, Galileo, or Beidou.

In some embodiments, however, GNSS or cellular positioning is not accurate, or may be otherwise unavailable. An example is an indoor setting where cellular or GNSS signals may not have sufficient signal strength. Another example may be in a place where there are several obstructions nearby, such as tall buildings. In yet another example, atmospheric conditions, such as rain or heavy clouds, may also affect GNSS signals, and using them may result in inaccurate positioning determination. The control circuitry 1420 and/or 1428 determines the availability or accurateness of such a GNSS or cellular signal at the location where the electronic device is located.

If a determination is made, at block 330, that the GNSS signal is available or is accurate, then at block 340, control circuitry 1420 and/or 1428 may cluster users based on proximity of users. In other words, the control circuitry 1420 and/or 1428 may obtain wireless parameters of the electronic devices and cluster the users based on commonality in wireless parameters (e.g., strength of a wireless signal or the time of flight of the wireless signal).

If a determination is made, at block 330, that the GNSS signal is not available or is inaccurate, then, at block 350, the control circuitry 1420 and/or 1428 may acquire wireless parameters with a CSI matrix (described in further detail in relation to FIGS. 6A-8) and use the wireless parameters to cluster users.

Channel state information or CSI is a wireless communication terminology that refers to channel properties of a communication link. These channel properties allow a system to determine various parameters of the signal transmitted from the transmitter to the receiver, for example the system may determine whether the wireless signal decays by the time it reaches the receiver and if so to what extent. The system may also determine other signal related issues, such as signal strength. Understanding various channel properties, which can be presented in a CSI matrix, allows the system to modify transmissions as needed to adapt to the current state of the channel to achieve high data rate transmission.

In some embodiments, the control circuitry 1420 and/or 1428 may obtain the communication channel's characteristics and use it to understand the channel. One of the mechanisms used to obtain communication channel's characteristics is to use a mechanism called wireless channel sounding. The control circuitry 1420 and/or 1428 uses channel sounding to build the CSI matrix for the channel. The channel sounding information at different spaces will have a unique signature driven by different wireless parameters. Wireless channel sounding is used in most of the communication protocols. Wireless channel sounding sends a known transmitted signal, and the receiver gets the signal and uses the received signal to understand the channel characteristics. Channel sounding can be used in single carrier and multi-carrier transmission systems like OFDM and OFDMA. In addition, it can be used in wideband and narrowband systems.

In some embodiments, using one of the techniques, such as the channel sounding technique described above, the control circuitry 1420 and/or 1428 may segment users into different clusters. As mentioned earlier, the clusters are grouping of users where the wireless CSI information exhibits similarity between users. Using such techniques and CSI-based clustering can augment traditional cellular and GNSS-based positioning to improve accuracy.

Figure 4:
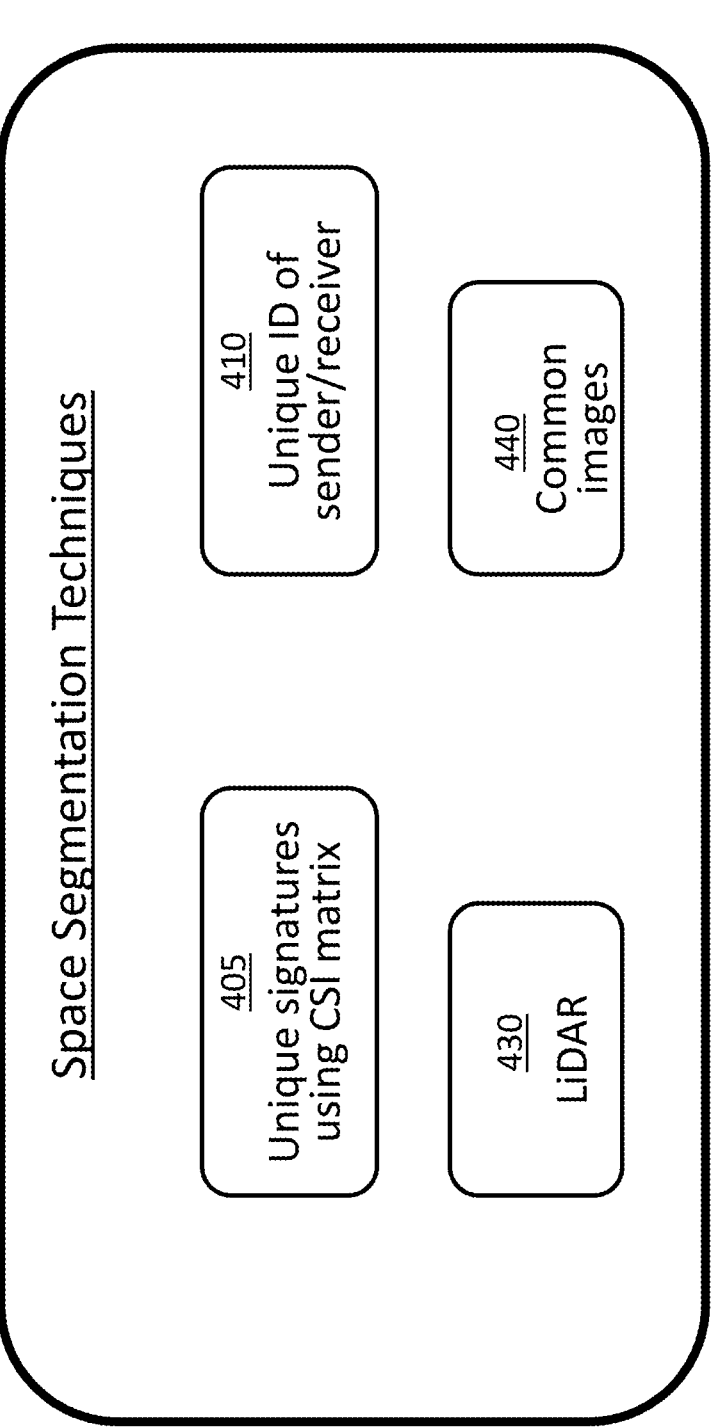
FIG. 4 is an example of techniques that may be used to perform space segmentation, in accordance with some embodiments of the disclosure.

As described in blocks 360 and 370 of FIG. 3, as well as in FIG. 4, in some embodiments, additional techniques may be used to perform clustering as a coarse-grained mechanism to separate users into physically separate spaces. Once users are separated into different physical spaces, traditional image- and LiDAR-based techniques (at block 370) can be used to understand the space of the common users and to enable interactive multi-player situations. The advantage of this method is that although GNSS-based positioning may be unavailable or inaccurate, multi-player scenarios are enabled by segmenting users into different physical spaces. This mechanism separates users into clusters before running computer vision (image segmentation) or depth mapping correlation that is computation-intensive, thus providing a scaling mechanism for multi-player interactions in AR.

All common markers discovered in blocks 370 and 380 may be stored, and the data may be tied to unique clusters for virtual object persistence. In other words, once relative orientation and position are determined, the data associated with relative orientation and position may be stored and used to accurately render the virtual object. Since the virtual object is anchored to the XR device whose relative orientation and position are determined by process 300, the persistence of the virtual object is accurately determined based on the stored data.

Some techniques used to determine data for discovering wireless and other similarities between users and segregating/segmenting them are depicted in FIG. 4. These techniques include using a CSI matrix to generate unique space segmentation signatures 405, determining unique ID of sender/receiver 410, using LiDAR 430, or using common images 440. Although a few techniques are described, the present disclosure is not so limited, and other space segmentation techniques may also be used. Any combination of the techniques may also be used.

Figure 5:
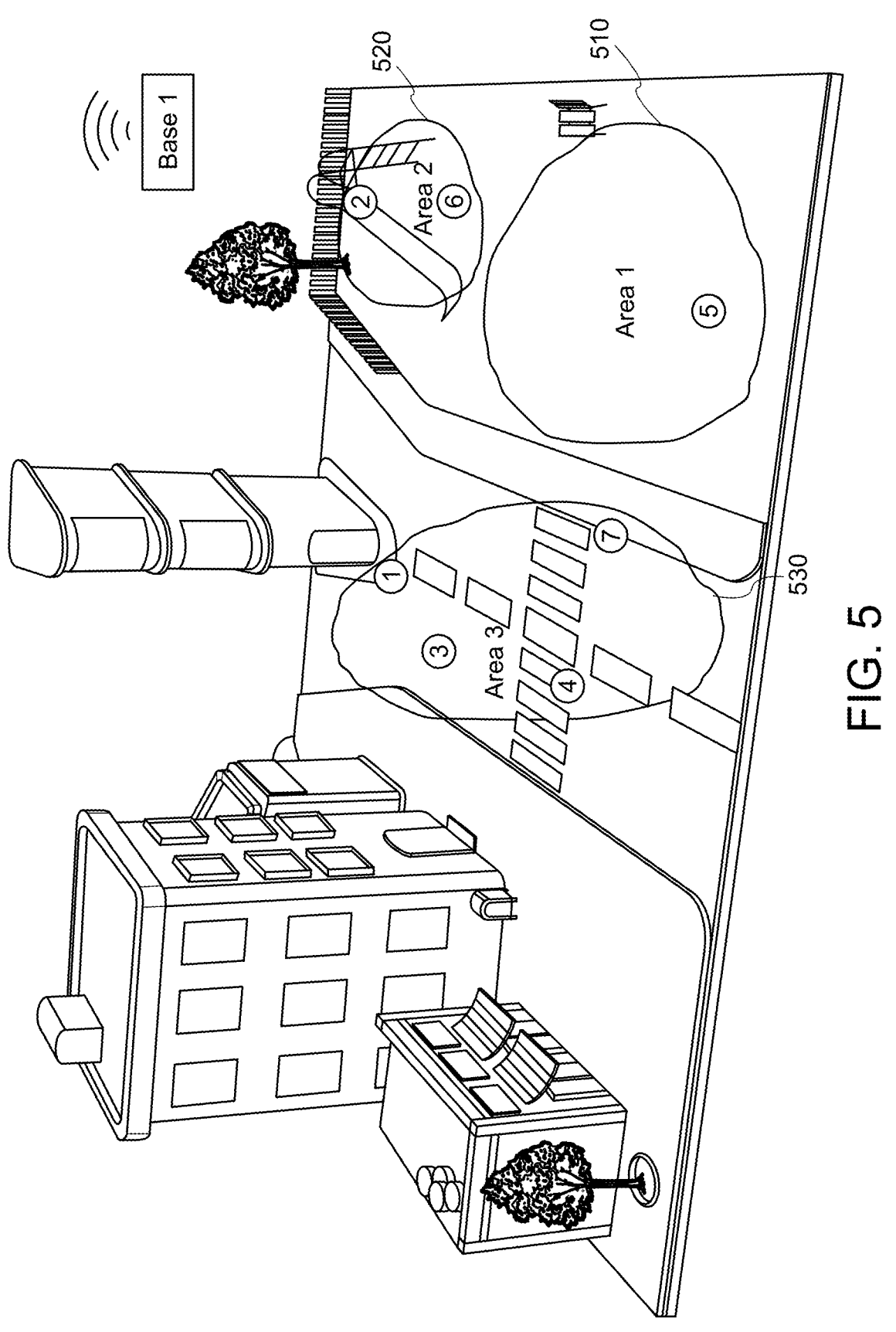
FIG. 5 is example of clusters of users that are segmented together based on common images, in accordance with some embodiments of the disclosure.

FIG. 5 describes the embodiment of using the common images 440 technique and FIGS. 6A-8 provide the embodiment of using the CSI matrix technique 405. With respect to FIG. 5, which is another technique used in space segmentation, instead of or in addition to the techniques described in FIGS. 6A and 6B below, is the use of common images (as referenced at block 440 in FIG. 4). Use of common images allows the system to determine that both users are likely in close proximity, as the images viewed from the user devices are common. For example, the system may determine, based on a common image being a playground in FIG. 5 for users 2 and 6, that the users are likely close to each other and should be clustered together. As such, the control circuitry 1420 and/or 1428 may group users 2 and 6 into a same cluster. Also, as can be seen in FIG. 5, the images of the crosswalk are common to users 1, 3, 4, and 7. As such, the control circuitry 1420 and/or 1428 may group these users into a same cluster.

Figure 6A:
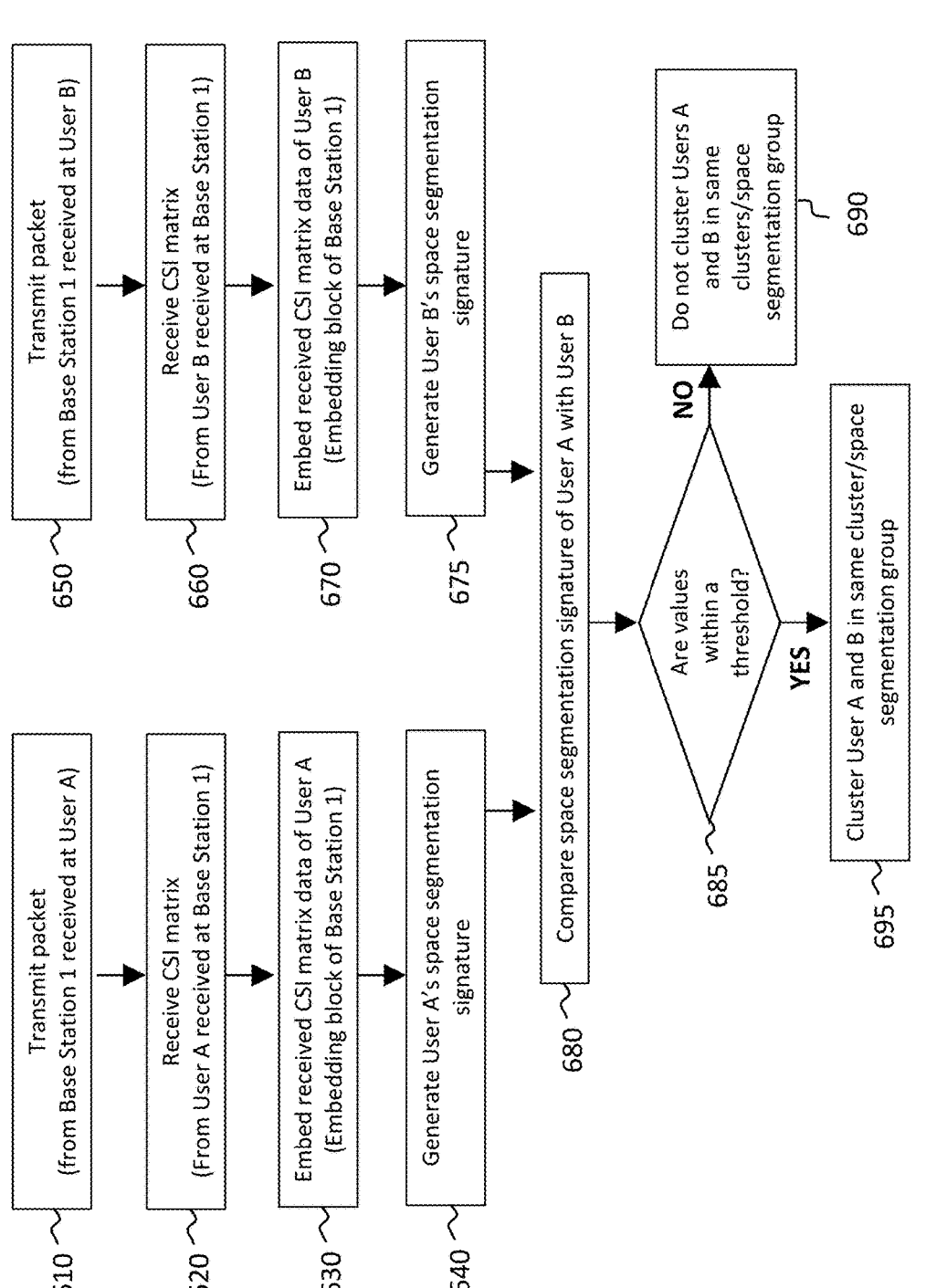
FIG. 6A is flowchart of a process of using the channel state information (CSI) matrix to perform space segmentation, in accordance with some embodiments of the disclosure.
Figure 6B:
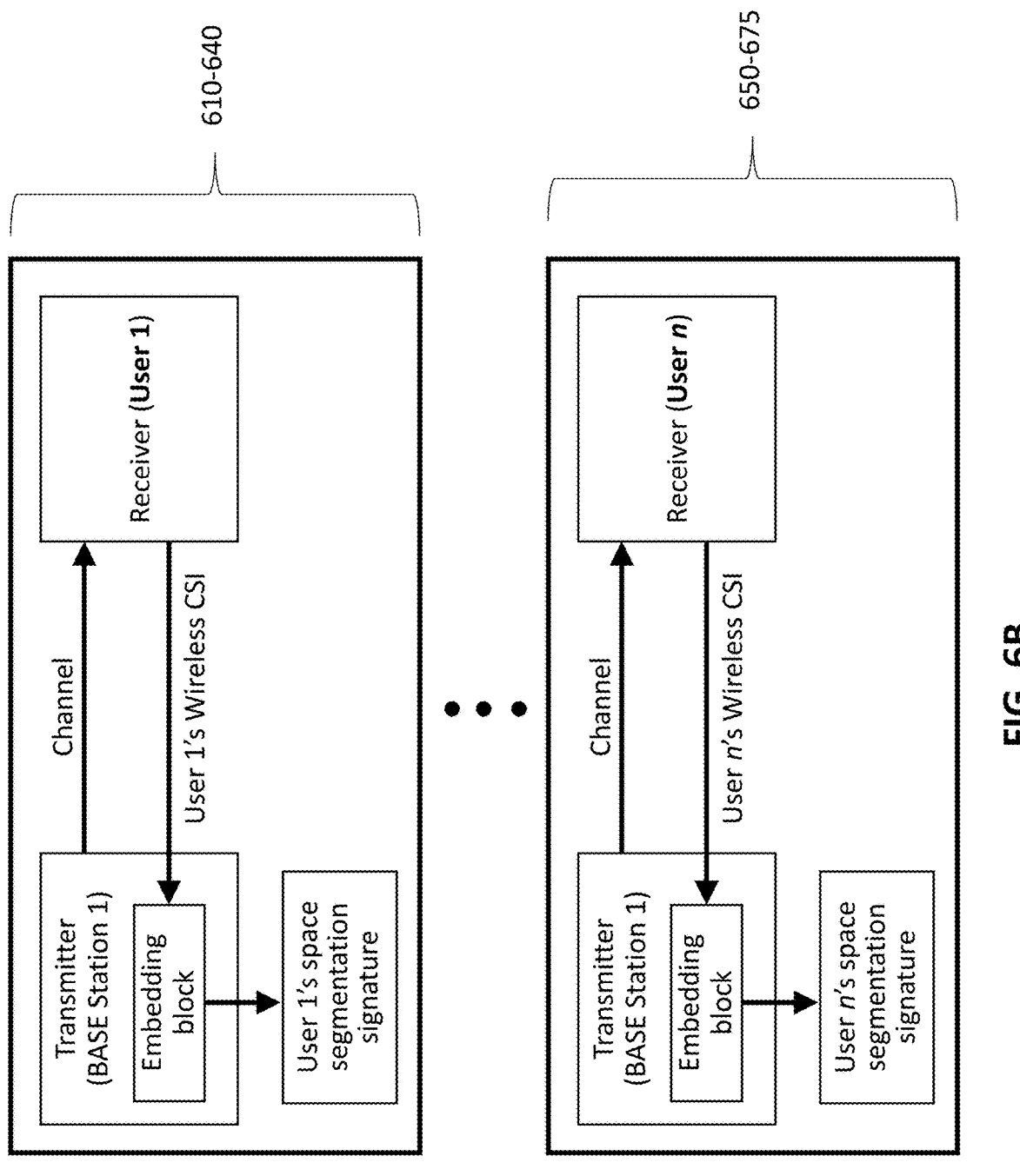
FIG. 6B is a block diagram representing communications between a base station and a user's electronic device to determine a user-specific space segmentation signature, in accordance with some embodiments of the disclosure.
Figure 7:
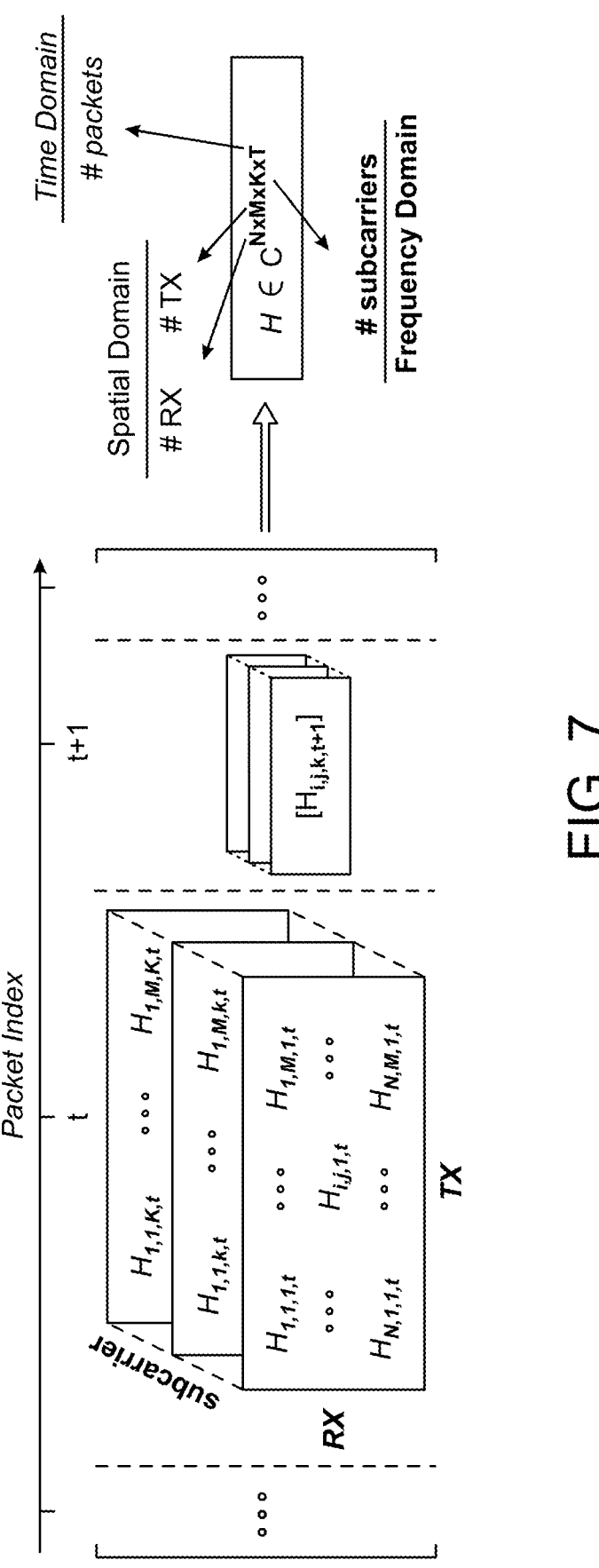
FIG. 7 is an example of a CSI matrix, in accordance with some embodiments of the disclosure.

FIGS. 6A-8 will be used to describe how a CSI matrix is generated and used to determine which users to segment or group together (also referred to in block 405 of FIG. 4). FIG. 6A is flowchart of a process of using the CSI matrix to perform space segmentation, in accordance with some embodiments of the disclosure. At block 610, a base station transmits a packet to each of the users in a multiuser or multiplayer AR/MR environment. At block 620, the user's electronic device, such as user A's electronic device, receives the packet and sends back a CSI matrix to the base station from which the packet was received. In doing so, user A's electronic device captures the signal received from the base station, captures the condition or state of the channel, and sends data in the form of the CSI matrix to the base station 1. The CSI matrix sent to the base station is specific to user A's electronic device. An example of a CSI matrix between a base station and a receiver is depicted in FIG. 7. Some of the data or parameters that can be derived from the CSI matrix are RSSI (received signal strength indicator), frequency and timing shifts, doppler shift, and changes in fading patterns, for example.

At block 630, upon receiving the CSI matrix from user A, base station 1 applies an embedding process to generate a space segmentation signature for user A, as depicted at block 640. The process of blocks 610-640 is also depicted in FIG. 6B, which shows the communications between the transmitter (base station) and receiver (user's electronic device) to send the packet, receive the CSI matrix, and embed using the data from the CSI matrix to generate a space segmentation signature for user A.

In some embodiments, the process of embedding involves transforming the CSI matrix, using a machine learning algorithm, into an embedding space. Since embedding is a technique that is used in machine learning, primarily to see the relationship between apparently distinct objects, in this embodiment embedding is used to determine the proximity of users to each other.

Any one of several available algorithms may be used for transformation of the CSI matrix into an embedding space.

In the embedding space, the set of samples from users in the same space would be close to each other, while users in different spaces will have embedding that is not close. The training set of samples would be used to train the parameters of the embedding algorithm to separate out the different spaces. Some examples of techniques used for embeddings include traditional distance vector calculation in KNN (K-nearest neighbors), PCA (principal component analysis) and t-SNE (t-distributed stochastic neighbor embedding). Additional embedding techniques can be utilized to develop the space signatures.

The same process as described in blocks 610-640 may be repeated between base station 1 and user B, as depicted in blocks 650-675, to generate a space segmentation signature for user B. If there are n number of users in the multiuser or multiplayer AR/MR environment, the process may be repeated for each such multiuser or multiplayer to generate a space segmentation signature for all the users.

At block 680, the space segmentation signatures of users A and B are compared to determine whether their values are within a threshold, as depicted at block 685. In other words, a determination is made whether the two users are close in physical distance to each other based on the space segmentation signatures, such as within a predetermined threshold distance.

Figure 8:
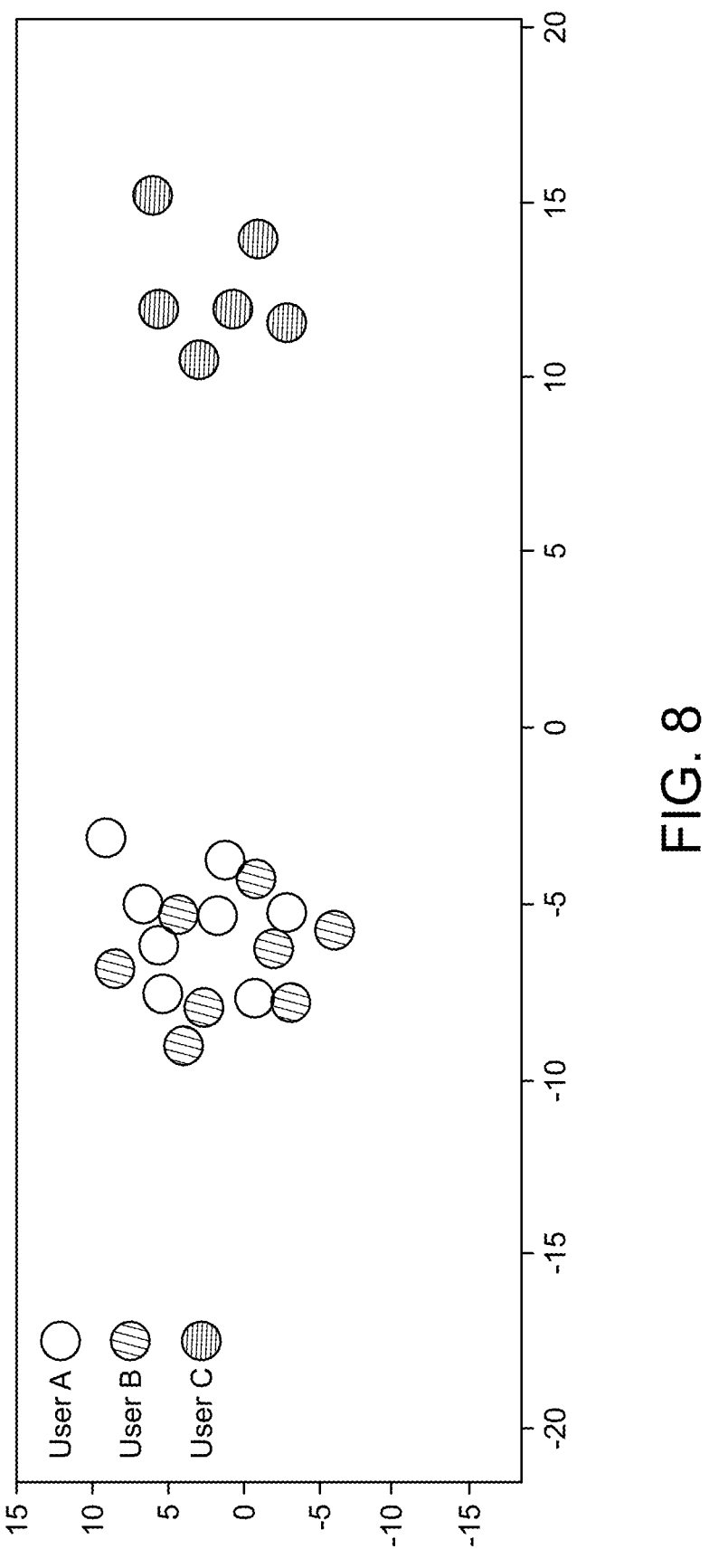
FIG. 8 is 2D visual representation of a CSI matrix for a plurality of users of the AR/MR experience, in accordance with some embodiments of the disclosure.

For the purpose of explanation, a visual representation of the CSI matrix for users of the multiuser or multiplayer AR/MR environment is depicted at FIG. 8. As depicted, based on their CSI matrix and space segmentation signatures generated, it can be seen that users A and B in FIG. 8 are close to each other. In this figure, different dots, such as with different gradient filling, represent different space segmentation or cluster groups, where each different gradient filled dot is based on a CSI matrix received by the base station from an electronic device. Although a gradient fill is used to represent different space segmentations or cluster groups, other visual representations, such as highlights, different colors, different text or font size within the dots, or other images instead of the dots, may also be used.

Referring back to block 685, if a determination is made that user A and B are close to each other, e.g., their values are within a threshold, then, at block 695, they are clustered together in a same group. However, if a determination is made at block 685 that users A and B are not close to each other, e.g., their values are not within a threshold, then, at block 690, they are not clustered together in a same group since they may be farther apart. For example, users 3 and 6 in FIG. 7 will not be segmented into a same cluster group (or space segmentation group) since their CSI matrix is farther apart.

Referring back to FIG. 1, once space segmentation is performed at block 102, and users are clustered into groups based on their proximity to each other and sharing of common wireless characteristics, then, at block 103, the control circuitry 1420 and/or 1428, as depicted in FIG. 14, may determine each user's position based on separating LOS and nLOS wireless signals. In other words, the control circuitry 1420 and/or 1428 may determine the position of each electronic device associated with the users based on separating LOS and nLOS wireless signals. As referred to herein, LOS is the abbreviation for line of sight for wireless signal paths and nLOS is the abbreviation for non-line of sight, i.e., the signal reaches the end destination after encountering obstacles that prevent a direct line of sight to the destination.

In some embodiments, the control circuitry 1420 and/or 1428 separates LOS wireless signals from nLOS wireless signals. Since LOS communication has a dominant LOS signal, and possibly a few reflected components, and nLOS communication has many reflected components, the control circuitry 1420 and/or 1428 may distinguish between LOS and nLOS signals such that only LOS signals are used for determining user position and orientation. In other words, with LOS communication, the dominant component does not change as much compared to that of nLOS communication, and as such, using the LOS signal results in a higher level of accuracy in determining position and orientation. Accordingly, the control circuitry 1420 and/or 1428 distinguishes between LOS and nLOS and uses LOS to select stationary anchors, such as base stations or access points, that can be used as reference points for understanding position and orientation.

In some embodiments, LOS/nLOS wireless signals are used by the control circuitry 1420 and/or 1428 to determine absolute position of the users from the base stations or access points to determine position and proximity between users. In some embodiments, the precise direction of a beaconing source, such the base station, is determined based on processing the wireless signal to derive the LOS component. Beaconing relies on signal strength/RSSI sensing, and by measuring the RSSI values temporally it is possible to determine whether a device/user is moving closer to (RSSI increasing) or farther away (RSSI decreasing) from the beaconing source. Once absolute position of each user with respect to the base station(s) or access point(s) is determined, the control circuitry 1420 and/or 1428 uses the information to calculate position and proximity between users. As such, the control circuitry 1420 and/or 1428 determines whether the users are close to each other or far from each other. The control circuitry 1420 and/or 1428 is thus able to determine a precise location (when proximity is closer to base station) or a coarse location (when proximity to the base station is far), including their X and Y coordinates, of each user and the proximity between users.

Figure 9:
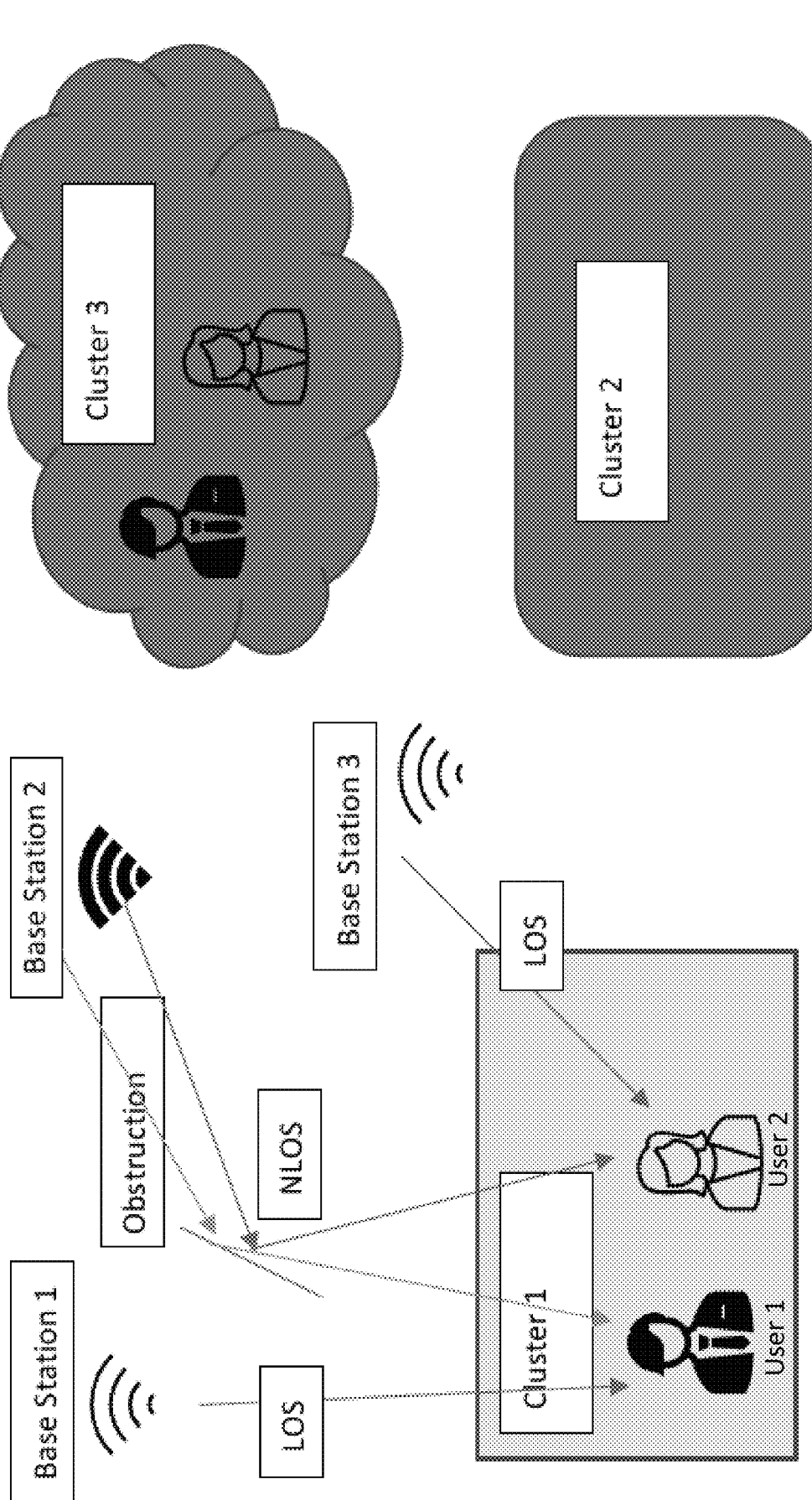
FIG. 9 is an example of distinguishing between LOS and nLOS wireless paths of a signal to determine each user's relative position, in accordance with some embodiments of the disclosure.

FIG. 9 is an example of the process described in block 103, where LOS and nLOS signals are distinguished and a dominant LOS component is determined, along with RSSI values, to determine each user's absolute position. As depicted in FIG. 9, user 1 and user 2 may have been placed together in a cluster group, such as cluster 1, based on space segmentation techniques described in block 102 of FIG. 1.

As depicted, the signal from base station 1 has a direct LOS to user 1. However, a signal from base station 2 does not have a direct LOS to user 1; instead the signal from base station 2 reflects from or passes through an obstruction before reaching user 1. In this example, the control circuitry 1420 and/or 1428 uses the signal from base station 1, which is an LOS signal for user 1, instead of the signal from base station 2, which is an nLOS signal.

With respect to user 2, as depicted, the wireless signal from base station 3 has a direct LOS to user 2. However, a wireless signal from base station 2 does not have a direct LOS to user 2; instead, the wireless signal from base station 2 reflects from or passes through the obstruction before reaching user 2. In this example, the control circuitry 1420 and/or 1428, as depicted in FIG. 14, uses the wireless signal from base station 3, which is an LOS wireless signal for user 2, instead of the wireless signal from base station 2, which is an nLOS wireless signal.

In this example, since only LOS components are used, the wireless base stations can be considered as fixed in position. The positions of the wireless base stations can be used as markers in determining the location of each user within the same cluster. As such, using the LOS signals from base station 1 for user 1, where base station 1 is used as a fixed marker, and base station 3 for user 2, where base station 3 is used as a fixed marker, the control circuitry 1420 and/or 1428 determines the position of the user 1 and user 2 with respect to the base stations and with respect to each other.

Referring back to block 103 of FIG. 1, as described earlier, in some embodiments, relative position of each electronic device associated with a user is determined. The determination comprises detecting that a wireless signal has been received by the electronic device. A determination is made whether the received wireless signal is an LOS or an nLOS wireless signal. In response to determining that the wireless signal is an LOS wireless signal, the control circuitry selects a base station (or an access point) as a stationary reference point. In some embodiments, the base station or access point selected is common to the electronic devices segmented into a same cluster. The position of the electronic device is based on this selected reference point. This includes determining a direction of the LOS wireless signal from the reference point to the electronic device and/or determining a distance from the reference point to the electronic device based on a time taken by the LOS wireless signal to reach the electronic device.

However, if it is determined that the wireless signal is an nLOS wireless signal, then the control circuitry does not use the nLOS wireless signal for determining position of the electronic devices. This is because the nLOS signal has several reflective components that impact the accuracy of determined position and orientation. In such situations, the control circuitry may continue to scan for an LOS wireless signal and, when the LOS wireless signal is detected, use it to determine the electronic device's position.

At block 104 of FIG. 1, in some embodiments, the control circuitry 1420 and/or 1428 determines the user orientation based on a wireless signal's angle of arrival and departure technique. Using this angle of arrival/departure technique, orientation (absolute orientation) relative to the base stations or access points is determined. In other words, where is the user device located in relation to the base station. Once the absolute orientation for each user relative to the same base station is determined, the data is used to determine the orientation between the users. In one embodiment, the process of determining relative orientation between the user based on their absolute orientation with respect to the same base station includes determining each user's absolute orientation with respect to the same base station. For example, in FIG. 5, the angle of arrival/departure of a wireless signal at user 2 with respect to base station 1, and the angle of arrival/departure of a wireless signal at user 6 with respect to base station 1 will be determined. In other words, the angle of the wireless signal transmitted by the base station as it is received by a device associated with the user is determined for angle of arrival. Then based on the absolute orientation data with respect to base station 1, the angles may be correlated to determine the relative orientation between users 2 and 6. For example, user 2 is at a 45° angle from the base station 1 and user 6 is at a 54° angle from base station 1, then their relative orientation may be calculated as 54°-45°=9°.

As mentioned earlier with respect to determining position in block 103 of FIG. 1, beaconing direction and related RSSI values are used to determine user position. The angle of arrival technique, as described in relation to block 104 of FIG. 1, improves on this technique. However, prior to applying angle of arrival/departure technique to the wireless signal, the control circuitry 1420 and/or 1428 processes the beaconing signal to derive an LOS component and determine absolute position of the users. Determining absolute position allows the control circuitry 1420 and/or 1428 to determine a precise direction of the beaconing, which then makes it possible to track even a moving beaconing source by periodically determining orientation between the source and the user.

To apply the angle of arrival/departure technique on a wireless signal in wireless communications, the control circuitry 1420 and/or 1428 uses multiple antenna systems to determine an angle at which the wireless signal is received, i.e., an angle from each antenna to the user. If the same wireless signal (simplified) is sent from multiple transmitters, the wireless signal will arrive at different times (and phases) at each of the receiver antennas. By phase shifting the received signals so that they are aligned at all the receiver antennas, the control circuitry 1420 and/or 1428, as depicted in FIG. 14, determines the phase shift between each of the receive paths and the angle of arrival/departure of the wireless signal. Determining the angle of arrival and departure of wireless signal allows the control circuitry 1420 and/or 1428 to accurately render virtual objects anchored to the user based on the user's distance and relative orientation from the base stations and access points. An example of the angle of arrival/departure technique is depicted in FIG. 10.

Figure 10:
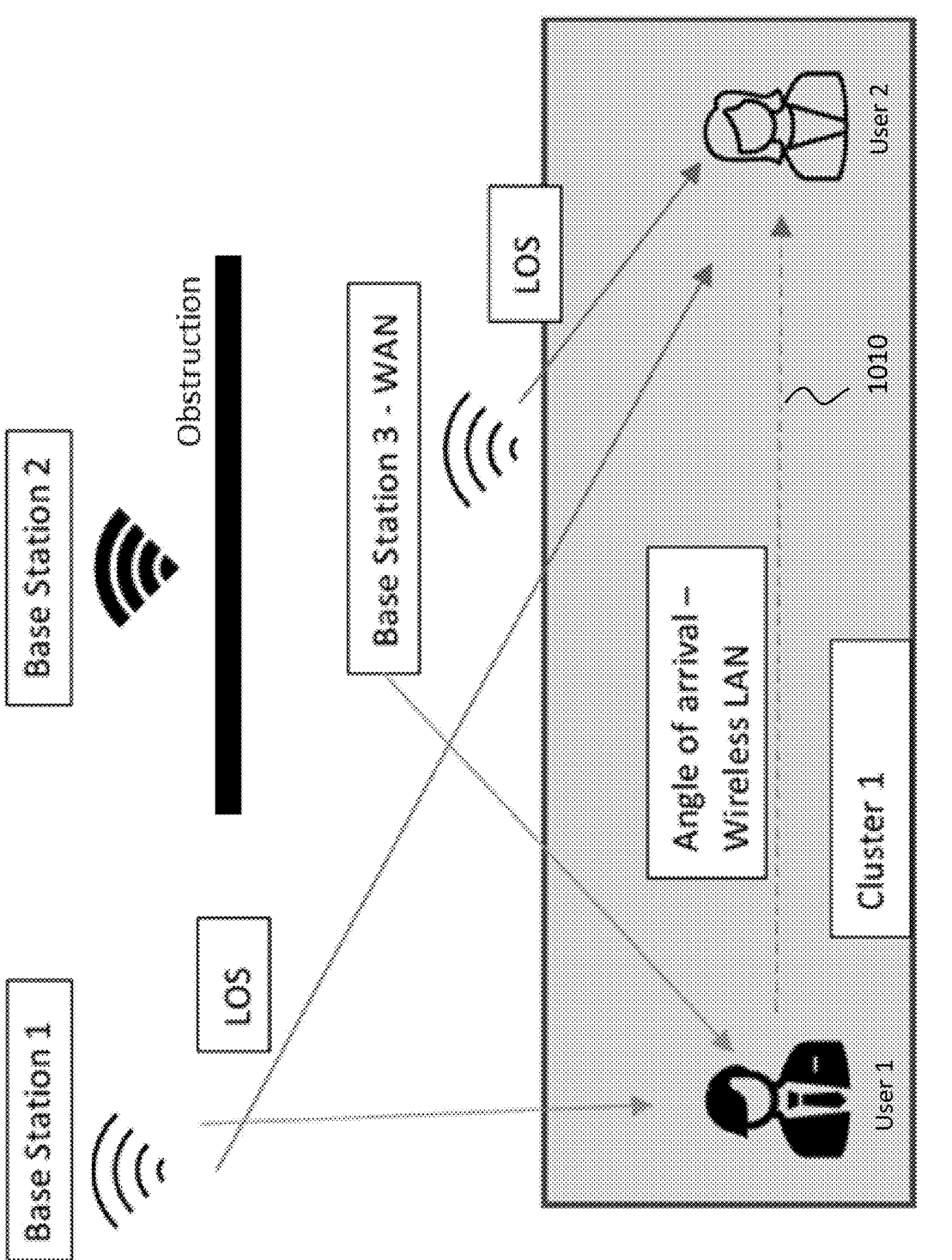
FIG. 10 is an example of an angle of arrival/departure technique used to determine each user's relative orientation, in accordance with some embodiments of the disclosure.

In FIG. 10, user 1 and user 2 are placed together in a cluster group, such as cluster 1, based on space segmentation techniques described in block 102 of FIG. 1. An LOS wireless signal is received by user 1 from base station 1 and 3 and an LOS wireless signal is received by user 2 from base stations 1 and 3. Wireless signals from base station 2 may not be used since they are nLOS wireless signals due to the obstruction in between the base station and the users. The control circuitry 1420 and/or 1428, as depicted in FIG. 14, uses base stations 1 and 3, more specifically their antennas, to calculate the angle of arrival of a wireless signal path to the user. Using the angle of arrival, relative orientation between users is determined. In some embodiments, the control circuitry 1420 and/or 1428 calculates the angle of arrival (AoA) and/or angle of departure (AoD) of a wireless path of a signal by using local area networks between the two users, as depicted by the dotted line 1010.

Referring back to block 104 of FIG. 1, as described earlier, relative orientation of each of the segmented electronic devices associated with different users is determined based on the analysis of the LOS wireless signal. In some embodiment, the analysis involves detecting a wireless signal received by an electronic device and determining whether the received wireless signal is an LOS or an nLOS wireless signal. If it is an nLOS signal, then it is discarded and not used to determine relative orientation. If it is an LOS wireless signal, then the control circuitry selects a base station as a stationary reference point (such as a base station that is common to all the electronic devices that are segmented together) and determines orientation of the electronic device based on the selected reference point. To do so, the control circuitry determines an angle of arrival of the LOS wireless signal received from the reference point to the electronic device and, using the angle, determines the relative orientation of the electronic device.

In some embodiments, multiple LOS signals from multiple base stations, or multiple antennas of base stations, are received. For example, a first LOS wireless signal from a first base station and a second LOS wireless signal from a second base station are received by the electronic device. The control circuitry then calculates a first angle of arrival based on the first LOS wireless signal and a second angle of arrival based on the second LOS wireless signal. The control circuitry then determines orientation of the electronic device associated with a user by triangulating the first and second calculated angles of arrival of the signal. In other words, the control circuitry uses the different angles of arrival from different base stations (and their antennas) to determine orientation of the electronic device. Having multiple angles of arrival also provides additional assurance that orientation calculated based on a single angle of arrival from a single base station was accurate.

Referring back to block 104 of FIG. 1, relative orientation of each of the segmented electronic devices is determined based on determining proximity, such as close or far, of the electronic device from the base station. Accordingly, the estimated distance of the electronic device from the base station is used to determine user orientation and position accurately. In some embodiments, when proximity between the electronic device and the base station is close, or within a predetermined distance, a more precise user orientation and position may be determined. In other embodiments, when proximity between the electronic device and the base station is farther, or outside a predetermined distance, a coarser user orientation and position may be determined. When coarse orientation and position are determined, other techniques, such as those described in blocks 103-105, may be used in addition to the coarse proximity determination to obtain a more precise orientation and position.

Having determined both position and orientation based on LOS signals, as described in blocks 103 and 104, the control circuitry 1420 and/or 1428 has the positional and orientational data needed to accurately position the user and their orientation and determine relative position and orientation between the users. Since virtual objects are anchored to the user, knowing the user position and orientation allows the control circuitry 1420 and/or 1428 to accurately render virtual object anchored to them.

In some embodiments, block 105 may be optional and blocks 102-104 may be used to determine all the positional and orientational data of the user as well as the user's relative position and orientation with other users. In other embodiments, block 105 may be used to determine precise user position and orientation as well as relative position and orientation with other users. This may especially be true when base stations used in blocks 103 and 104 are far away, resulting in a coarse position and orientation measurement.

At block 105, hello packets may be exchanged between users that are within a close proximity to each other. A hello packet, as referred to herein, is a data packet that is transmitted periodically to establish and confirm network adjacency relationships between devices in the Open Shortest Path First (OSPF) communications protocol. These are the users that are clustered together in the same cluster based on space segmentation techniques applied in block 102. In other words, the users may be within a predetermined proximity of each other to exchange packets in a peer-to-peer connection.

In this embodiment, angles of arrival of the hello packets are determined. The techniques used for determining angles of arrival between users may be the same technique as described earlier to separate out the LOS and nLOS components in blocks 103 and 104. However, the technology to measure the orientation of one user relative to a second user based on the exchange of hello packets may be different. For example, Wi-Fi technology may be used for hello packets instead of 5G or LTE used in blocks 103 and 104.

In one embodiment, a wireless signal transmitted by a base station is received by a device associated with the user. The control circuitry 1420 and/or 1428 of FIG. 14 may calculate the angle of arrival of this received wireless at the device. Likewise, the control circuitry 1420 and/or 1428 may calculate the angle of arrival of the wireless signal from the same base station received by all other devices associated with different users. Once angles of arrival for all devices within a same space segmentation group is calculated, the angles of arrival may be used to derive the relative orientation between each pair of users. For example, an angle of arrival of a wireless signal transmitted from a base station and received by a first user may be a different angle than a wireless signal transmitted from the same base station and received by the second user. After space segmentation and LOS/nLOS techniques have been applied and used to determine locations of users with respect to each other, the different angles may be used to determine their orientation with respect to the base station and with respect to each other.

Figure 11:
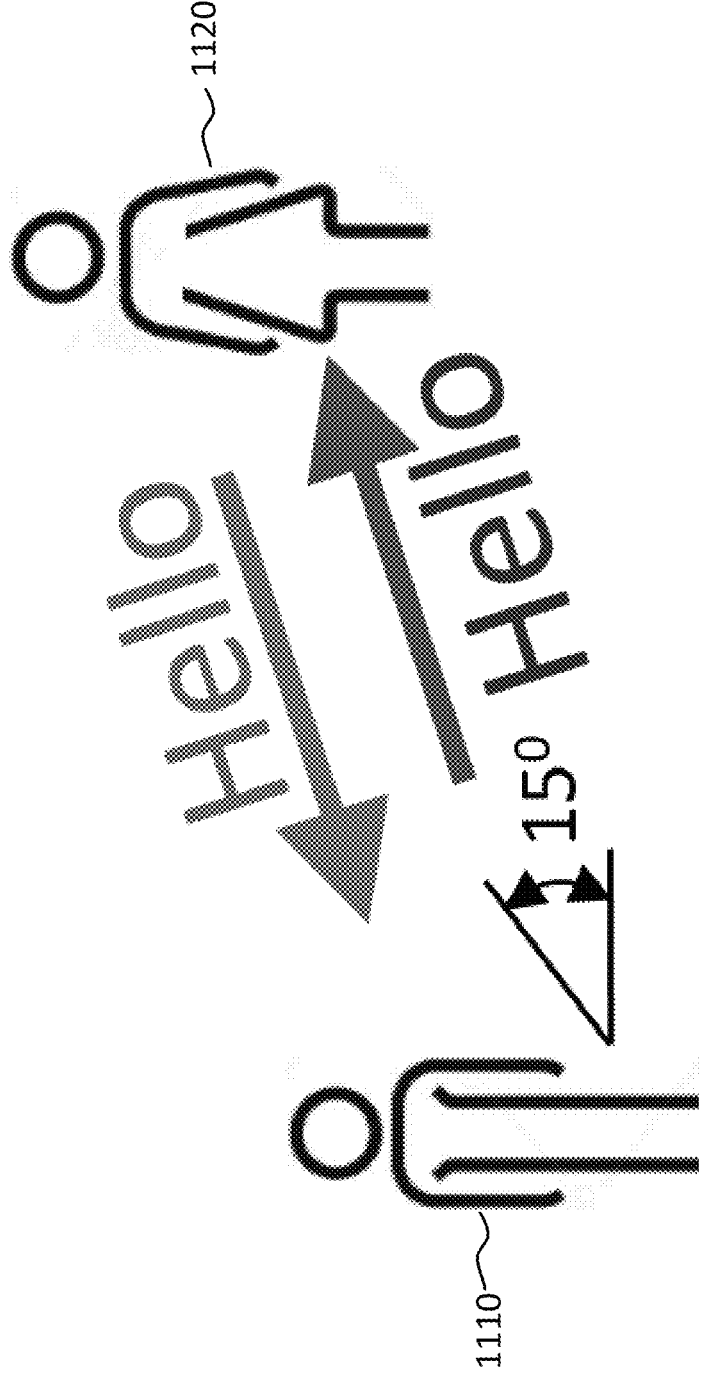
FIG. 11 is an example of exchange of hello packets between users in the same cluster to determine relative orientation between users in a peer-to-peer connection, in accordance with some embodiments of the disclosure.

An example of exchange of hello packets and their use in determining angle of arrival/departure is depicted in FIG. 11. In some embodiments, a first user 1110 and a second user 1120 may exchange a hello packet. For example, the first user's 1110 device may receive a hello packet transmitted by second user's 1120 device. An angle of arrival of the hello packet received by the first user may be calculated to be, in one embodiment, 15°. Since space segmentation has already been performed (e.g., at block 102 of FIG. 1) and first and second users have been placed in a same space segmentation group, or same cluster, based on their proximity to each other, space segmentation does not need to be performed again. Accordingly, space segmentation may only need to be performed in the initial phase when a determination is to be made whether first and second users are in close proximity to cluster them into the same space segmentation or cluster group. After the initial phase, in order to maintain and update relative orientation between the first and the second users, in some embodiments, the control circuitry 1420 and/or 1428 may only need to determine this angle of arrival based on the hello packet and not need to perform space segmentation again. The exchange of hello packets between users allows the system to periodically determine any changes in the relative orientation and use such data to update the rendering of the virtual object. The exchange may be periodic, scheduled at certain times, performed frequently, or may have a trigger, such as upon detection of a movement by any of the users to exchange a hello packet.

Figure 12:
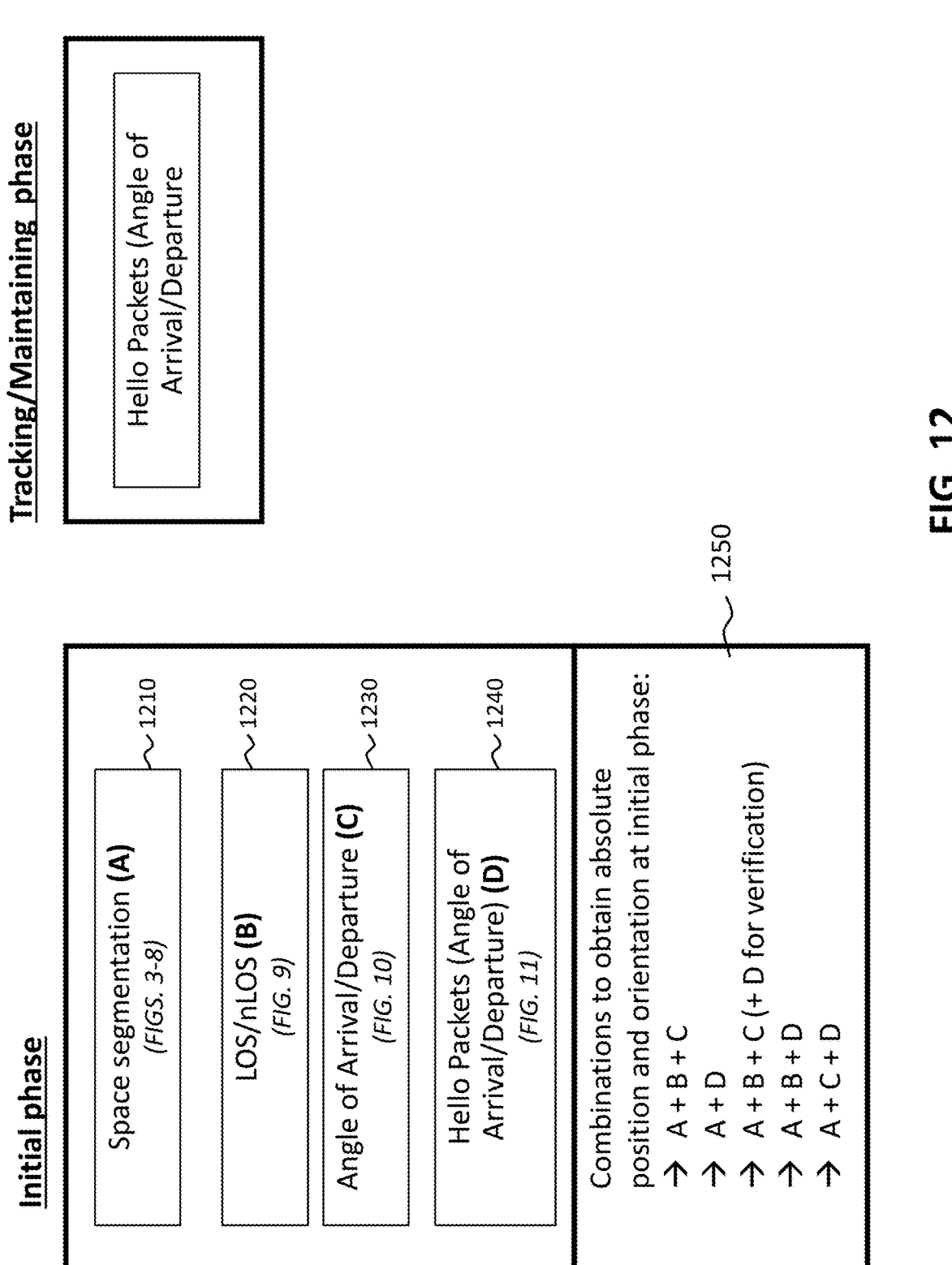
FIG. 12 depicts possible combinations of processes that may be performed to determine each user's relative position and orientation, in accordance with some embodiments of the disclosure.

As described at block 106, and also in FIG. 12, several combinations of processes described in blocks 102-105 of FIG. 1 may be performed to determine relative position and orientation of users. These combinations may include: a) blocks 102+103+104, b) blocks 102+103+105, c) blocks 102+104+105, and d) blocks 102+105.

At block 107, once relative position and orientation between users is determined based on any combination of processes described in block 106, the control circuitry 1420 and/or 1428 may render the virtual object accurately and in real time. Since the virtual object is anchored to a user, the control circuitry 1420 and/or 1428 may calculate the position and orientation of the virtual object based on the position and orientation of the user to which it is anchored. As such, the control circuitry 1420 and/or 1428 may render the virtual object such that it is correct for each user from their perspective view, thereby allowing all the users in the AR/MR environment to track the movement of the virtual object accurately.

FIG. 12 is an example of a sequence of processes that may be performed to obtain absolute position and orientation of the user and the user relative to other users in their cluster, in some embodiments of the disclosure. In some embodiments, the sequence of processes may include space segmentation, determining absolute position by distinguishing between LOS/nLOS and determining position from the base stations and access points, determining absolute orientation, also relative orientation, by determining the angles of arrival/departure of a wireless signal's path, and then determining relative orientation between users based on determining the angles of arrival/departure for exchanged hello packets.

In some embodiments, some combination of processes 1210-1240, as depicted at 1250 of FIG. 12, may be used to determine absolute position, absolute orientation, relative position, and relative orientation. Any combination of the sequence may be used to establish at an initial phase in order to cluster users together based on their proximity and shared wireless characteristic(s) and other shared parameters as described in FIG. 4. Once the initial phase has been established, i.e., users have been clustered, then, in some embodiments, there may be no need to continuously determine space segmentation. This is because it has already been established by this stage which users are close to each other such that they can be clustered together.

As such, in some embodiments, after the initial phase is completed, the control circuitry 1420 and/or 1428, as depicted in FIG. 14, may only need to continually, frequently, periodically, or upon some predetermined interval, determine angles of arrival/departure for hello packets exchanged between users of the same cluster to update relative orientation.

In another embodiment, determining the initial phase may involve determining absolute orientation of a first user with respect to a first base station, determining an absolute orientation of a second user with respect to a first base station, and using the absolute orientations of the first and second users to triangulate a relative orientation between the first and the second users.

FIG. 13 is an example of processes for determining relative orientation and Open Systems Interconnection (OSI) layers used to perform the processes, in accordance with some embodiments of the disclosure. In one embodiment, at the various layers 1320, signal metrics are received at block 1315. LOS components based on the statistical properties of the received signal are determined at block 1325. Angle of arrival/departure based on techniques such as determining angle of arrival/departure of signal between receiver and base station and signal processing techniques may be determined at block 1330. When referring to angle of arrival, it may be for an angle of the wireless signal transmitted by a base station that is received by a device associated with the user, i.e., angle calculated for the arrival at the device. The information relating to angle of arrival/departure, LOS/nLOS may be sent to the base station for processing at block 1335. Through communications using layers 3 (network layer) and 4 (transport layer) of the OSI model at block 1340, common reference points may be determined, and orientation of the user equipment may be calculated. The control circuitry may also request layer 1 (physical layer)/layer 2 (data link layer) of the OSI model to determine angle of arrival/departure and LOS/nLOS of a wireless signal and send that information to an AR engine for processing. The control circuitry may use layers 3 (network layer) and 4 (transport layer) of the OSI model at block 1340 for communication with the application layer 1345. At block 1350, the communication circuitry may develop common reference points, calculate orientation of user equipment (e.g., user devices) using the common reference points, and control requests to layer 1 (physical layer) and layer 2 (data link layer) for determining angle of arrival (AoA), angle of departure (AoD), LOS and nLOS. The AoA, AoD, LOS, and nLOS data may then be sent to an AR engine for processing such that it may use the data to accurately render the virtual object that is anchored to a user device.

Figure 15:
FIG. 15 is a block diagram of an electronic device for determining relative position and orientation between users in an AR/MR environment, in accordance with some embodiments of the disclosure.

FIG. 14 is a block diagram of an example system for determining relative position and orientation between users in an AR/MR environment, and FIG. 15 is a block diagram of an electronic device for determining relative position and orientation between users in an AR/MR environment, in accordance with some embodiments of the disclosure.

FIGS. 14 and 15 also describe example devices, systems, servers, and related hardware that may be used to implement processes, functions, and functionalities described in relation to FIGS. 1-13. Further, FIGS. 14 and 15 may also be used for detecting an AR/MR multiplayer environment or multiple users engaging with the AR/MR multiplayer environment, performing space segmentation using one or more techniques, including based on unique signatures using CSI matrices, unique IDs of sender/receiver, LiDAR, and common images, determining whether a signal received at a receiver of an electronic device is an LOS or an nLOS signal using the LOS signal to determine user position and orientation, such as by using angle of arrival or departure of the received signal, exchanging hello packets between users that are segmented together in a same cluster to obtain precise orientation between the users, using any combination of techniques, such as space segmentation and LOS/nLOS, or space segmentation and exchange of hello packets, or space segmentation and LOS/nLOS and angles of arrival and departure, or LOS/nLOS and angles of arrival and departure and exchange of hello packets, anchoring a virtual object to an electronic device, rendering the virtual object based on determined relative position and orientation between the user of the AR/MR multiplayer environment that are clustered in a same cluster, maintaining or updating the relative orientation between users by periodically, or at determined intervals, determining the angle of arrival of signals between the users based on exchange of hello packets, and performing functions related to all other processes and features described herein.

In some embodiments, one or more parts of, or the entirety of system 1400, may be configured as a system implementing various features, processes, functionalities and components of FIGS. 1-13. Although FIG. 14 shows a certain number of components, in various examples, system 1400 may include fewer than the illustrated number of components and/or multiples of one or more of the illustrated number of components.

System 1400 is shown to include a computing device 1418, a server 1402 and a communication network 1414. It is understood that while a single instance of a component may be shown and described relative to FIG. 14, additional instances of the component may be employed. For example, server 1402 may include, or may be incorporated in, more than one server. Similarly, communication network 1414 may include, or may be incorporated in, more than one communication network. Server 1402 is shown communicatively coupled to computing device 1418 through communication network 1414. While not shown in FIG. 14, server 1402 may be directly communicatively coupled to computing device 1418, for example, in a system absent or bypassing communication network 1414.

Communication network 1414 may comprise one or more network systems, such as, without limitation, an internet, LAN, WIFI or other network systems suitable for audio processing applications. In some embodiments, system 1400 excludes server 1402, and functionality that would otherwise be implemented by server 1402 is instead implemented by other components of system 1400, such as one or more components of communication network 1414. In still other embodiments, server 1402 works in conjunction with one or more components of communication network 1414 to implement certain functionality described herein in a distributed or cooperative manner. Similarly, in some embodiments, system 1400 excludes computing device 1418, and functionality that would otherwise be implemented by computing device 1418 is instead implemented by other components of system 1400, such as one or more components of communication network 1414 or server 1402 or a combination. In still other embodiments, computing device 1418 works in conjunction with one or more components of communication network 1414 or server 1402 to implement certain functionality described herein in a distributed or cooperative manner.

Computing device 1418 includes control circuitry 1428, display 1434 and input circuitry 1416. Control circuitry 1428 in turn includes transceiver circuitry 1462, storage 1438 and processing circuitry 1440. In some embodiments, computing device 1418 or control circuitry 1428 may be configured as electronic device 1500 of FIG. 15.

Server 1402 includes control circuitry 1420 and storage 1424. Each of storages 1424 and 1438 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 4D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 1424, 1438 may be used to store various types of content (e.g., absolute orientations, relative orientations, information related to which users are segmented together in a same cluster, CSI matrices for each user, unique space segmentation signature of each user, AR/MR applications, and AI and ML algorithms). Non-volatile memory may also be used (e.g., to launch a boot-up routine, launch an app, render an app, and other instructions). Cloud-based storage may be used to supplement storages 1424, 1438 or instead of storages 1424, 1438. In some embodiments, data relating to absolute orientations, relative orientations, information related to which users are segmented together in a same cluster, CSI matrices for each user, unique space segmentation signature of each user, AR/MR applications, and AI and ML algorithms and data relating to all other processes and features described herein, may be recorded and stored in one or more of storages 1412 and/or 1438.

In some embodiments, control circuitry 1420 and/or 1428 executes instructions for an application stored in memory (e.g., storage 1424 and/or storage 1438). Specifically, control circuitry 1420 and/or 1428 may be instructed by the application to perform the functions discussed herein. In some implementations, any action performed by control circuitry 1420 and/or 1428 may be based on instructions received from the application. For example, the application may be implemented as software or a set of executable instructions that may be stored in storage 1424 and/or 1438 and executed by control circuitry 1420 and/or 1428. In some embodiments, the application may be a client/server application where only a client application resides on computing device 1418, and a server application resides on server 1402.

The application may be implemented using any suitable architecture. For example, it may be a stand-alone application wholly implemented on computing device 1418. In such an approach, instructions for the application are stored locally (e.g., in storage 1438), and data for use by the application is downloaded on a periodic basis (e.g., from an out-of-band feed, from an internet resource, or using another suitable approach). Control circuitry 1428 may retrieve instructions for the application from storage 1438 and process the instructions to perform the functionality described herein. Based on the processed instructions, control circuitry 1428 may determine a type of action to perform in response to input received from input circuitry 1416 or from communication network 1414. For example, in response to detecting movement of a headset worn by a user in the AR/MR game where multiple users are engaged, the control circuitry 1428 may periodically or at predetermined intervals calculate relative orientation between the users that are segmented together in a same cluster to determine whether relative orientation information needs to be updated. It may also perform steps of processes described in FIGS. 1, 3, 6A, 6B, 12, and 13.

In client/server-based embodiments, control circuitry 1428 may include communication circuitry suitable for communicating with an application server (e.g., server 1402) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 1414). In another example of a client/server-based application, control circuitry 1428 runs a web browser that interprets web pages provided by a remote server (e.g., server 1402). For example, the remote server may store the instructions for the application in a storage device. The remote server may process the stored instructions using circuitry (e.g., control circuitry 1428) and/or generate displays. Computing device 1418 may receive the displays generated by the remote server and may display the content of the displays locally via display 1434. This way, the processing of the instructions is performed remotely (e.g., by server 1402) while the resulting displays, such as the display windows described elsewhere herein, are provided locally on computing device 1418. Computing device 1418 may receive inputs from the user via input circuitry 1416 and transmit those inputs to the remote server for processing and generating the corresponding displays. Alternatively, computing device 1418 may receive inputs from the user via input circuitry 1416 and process and display the received inputs locally, by control circuitry 1428 and display 1434, respectively.

Server 1402 and computing device 1418 may transmit and receive content and data such as angles of arrival and departure of wireless signals, absolute orientations, relative orientations, information related to which users are segmented together in a same cluster, CSI matrices for each user, unique space segmentation signature of each user, and AR/MR applications. Control circuitry 1420, 1428 may send and receive commands, requests, and other suitable data through communication network 1414 using transceiver circuitry 1460, 1462, respectively. Control circuitry 1420, 1428 may communicate directly with each other using transceiver circuits 1460, 1462, respectively, avoiding communication network 1414.

It is understood that computing device 1418 is not limited to the embodiments and methods shown and described herein. In nonlimiting examples, computing device 1418 may be an electronic device, a personal computer (PC), a laptop computer, a tablet computer, a PC media server, a PC media center, a handheld computer, a mobile telephone, a smartphone, a virtual, augmented, or mixed reality device, or a device that can perform function in the metaverse, or any other device, computing equipment, or wireless device, and/or combination of the same capable of determining relative position and orientation and using it to render virtual objects.

Control circuitry 1420 and/or 1418 may be based on any suitable processing circuitry such as processing circuitry 1426 and/or 1440, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 1420 and/or control circuitry 1418 is configured for detecting an AR/MR multiplayer environment or multiple users engaging with the AR/MR multiplayer environment, performing space segmentation using one or more techniques, including based on unique signatures using CSI matrices, unique IDs of sender/receiver, LiDAR, and common images, determining whether a signal received at a receiver of an electronic device is an LOS or an nLOS signal using the LOS signal to determine user position and orientation, such as by using angle of arrival or departure of the received signal, exchanging hello packets between users that are segmented together in a same cluster to obtain precise orientation between the users, using any combination of techniques, such as space segmentation and LOS/nLOS, or space segmentation and exchange of hello packets, or space segmentation and LOS/nLOS and angles of arrival and departure, or LOS/nLOS and angles of arrival and departure and exchange of hello packets, anchoring a virtual object to an electronic device, rendering the virtual object based on determined relative position and orientation between the user of the AR/MR multiplayer environment that are clustered in a same cluster, maintaining or updating the relative orientation between users by periodically, or at determined intervals, determining the angle of arrival of signals between the users based on exchange of hello packets, and performing functions related to all other processes and features described herein.

Computing device 1418 receives a user input 1404 at input circuitry 1416. For example, computing device 1418 may detect movement of a headset worn by a user in the AR/MR game where multiple users are engaged, and may periodically or at predetermined intervals calculate relative orientation between the users that are segmented together in a same cluster to determine whether relative orientation information needs to be updated. It may also perform steps of processes described in FIGS. 1, 3, 6A, 6B, 12, and 13. Transmission of user input 1404 to computing device 1418 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, 5G, or any other suitable wireless transmission protocol. Input circuitry 1416 may comprise a physical input port such as a 3.5 mm audio jack, RCA audio jack, USB port, ethernet port, or any other suitable connection for receiving audio over a wired connection or may comprise a wireless receiver configured to receive data via Bluetooth, WIFI, WiMAX, GSM, UTMS, CDMA, TDMA, 3G, 4G, 4G LTE, 5G, or other wireless transmission protocols.

Processing circuitry 1440 may receive input 1404 from input circuit 1416. Processing circuitry 1440 may convert or translate the received user input 1404 that may be in the form of voice input into a microphone, or movement or gestures to digital signals. In some embodiments, input circuit 1416 performs the translation to digital signals. In some embodiments, processing circuitry 1440 (or processing circuitry 1426, as the case may be) carries out disclosed processes and methods. For example, processing circuitry 1440 or processing circuitry 1426 may perform processes as described in FIGS. 1-13, respectively.

FIG. 15 is a block diagram of an electronic device used for consuming a content item, in accordance with some embodiments of the disclosure. In an embodiment, the equipment device 1500, is the same equipment device 1402 of FIG. 14. The equipment device 1500 may receive content and data via input/output (I/O) path 1502. The I/O path 1502 may provide audio content (e.g., such as in the speakers of an XR headset). The control circuitry 1504 may be used to send and receive commands, requests, and other suitable data using the I/O path 1502. The I/O path 1502 may connect the control circuitry 1504 (and specifically the processing circuitry 1506) to one or more communications paths or links (e.g., via a network interface), any one or more of which may be wired or wireless in nature. Messages and information described herein as being received by the equipment device 1500 may be received via such wired or wireless communication paths. I/O functions may be provided by one or more of these communications paths or intermediary nodes but are shown as a single path in FIG. 15 to avoid overcomplicating the drawing.

The control circuitry 1504 may be based on any suitable processing circuitry such as the processing circuitry 1506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 or i9 processor).

In client-server-based embodiments, the control circuitry 1504 may include communications circuitry suitable for detecting an AR/MR multiplayer environment or multiple users engaging with the AR/MR multiplayer environment, performing space segmentation using one or more techniques, including based on unique signatures using CSI matrices, unique IDs of sender/receiver, LiDAR, and common images, determining whether a signal received at a receiver of an electronic device is an LOS or an nLOS signal using the LOS signal to determine user position and orientation, such as by using angle of arrival or departure of the received signal, exchanging hello packets between users that are segmented together in a same cluster to obtain precise orientation between the users, using any combination of techniques, such as space segmentation and LOS/nLOS, or space segmentation and exchange of hello packets, or space segmentation and LOS/nLOS and angles of arrival and departure, or LOS/nLOS and angles of arrival and departure and exchange of hello packets, anchoring a virtual object to an electronic device, rendering the virtual object based on determined relative position and orientation between the user of the AR/MR multiplayer environment that are clustered in a same cluster, maintaining or updating the relative orientation between users by periodically, or at determined intervals, determining the angle of arrival of wireless signals between the users based on exchange of hello packets, and performing functions related to all other processes and features described herein.

The instructions for carrying out the above-mentioned functionality may be stored on one or more servers. Communications circuitry may include a cable modem, an integrated service digital network (ISDN) modem, a digital subscriber line (DSL) modem, a telephone modem, ethernet card, or a wireless modem for communications with other equipment, or any other suitable communications circuitry. Such communications may involve the internet or any other suitable communications networks or paths. In addition, communications circuitry may include circuitry that enables peer-to-peer communication of primary equipment devices, or communication of primary equipment devices in locations remote from each other (described in more detail below).

Memory may be an electronic storage device provided as the storage 1508 that is part of the control circuitry 1504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum-storage devices, gaming consoles, gaming media, or any other suitable fixed or removable storage devices, and/or any combination of the same. The storage 1508 may be used to store various types of content, (e.g., absolute orientations, relative orientations, information related to which users are segmented together in a same cluster, CSI matrices for each user, unique space segmentation signature of each user, AR/MR applications, and AI and ML algorithms). Cloud-based storage, described in relation to FIG. 15, may be used to supplement the storage 1508 or instead of the storage 1508.

The control circuitry 1504 may include audio generating circuitry and tuning circuitry, such as one or more analog tuners, audio generation circuitry, filters or any other suitable tuning or audio circuits or combinations of such circuits. The control circuitry 1504 may also include scaler circuitry for upconverting and down converting content into the preferred output format of the electronic device 1500. The control circuitry 1504 may also include digital-to-analog converter circuitry and analog-to-digital converter circuitry for converting between digital and analog signals. The tuning and encoding circuitry may be used by the electronic device 1500 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 1508 is provided as a separate device from the electronic device 1500, the tuning and encoding circuitry (including multiple tuners) may be associated with the storage 1508.

The user may utter instructions to the control circuitry 1504, which are received by the microphone 1516. The microphone 1516 may be any microphone (or microphones) capable of detecting human speech. The microphone 1516 is connected to the processing circuitry 1506 to transmit detected voice commands and other speech thereto for processing. In some embodiments, voice assistants (e.g., Siri, Alexa, Google Home and similar such voice assistants) receive and process the voice commands and other speech.

The electronic device 1500 may include an interface 1510. The interface 1510 may be any suitable user interface, such as a remote control, mouse, trackball, keypad, keyboard, touchscreen, touchpad, stylus input, joystick, or other user input interfaces. A display 1512 may be provided as a stand-alone device or integrated with other elements of the electronic device 1500. For example, the display 1512 may be a touchscreen or touch-sensitive display. In such circumstances, the interface 1510 may be integrated with or combined with the microphone 1516. When the interface 1510 is configured with a screen, such a screen may be one or more monitors, a liquid crystal display (LCD) for a mobile device, active-matrix display, light-emitting diode display, organic light-emitting diode display, quantum-dot display, or any other suitable equipment for displaying visual images. In some embodiments, the display 1512 may be a 3D display. The speaker (or speakers) 1514 may be provided as integrated with other elements of electronic device 1500 or may be a stand-alone unit. In some embodiments, the display 1512 may be outputted through speaker 1514.

The equipment device 1500 of FIG. 15 can be implemented in system 1400 of FIG. 14 as primary equipment device 1402, but any other type of user equipment suitable for allowing communications between two separate user devices for performing the functions related to implementing machine learning (ML) and artificial intelligence (AI) algorithms, and all the functionalities discussed associated with the figures mentioned in this application.

It will be apparent to those of ordinary skill in the art that methods involved in the above-mentioned embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for determining relative orientation between electronic devices in a mixed reality (MR) environment comprising:

detecting engagement of a plurality of electronic devices, wherein each electronic device is associated with a different user, with a multi-user MR environment;

segmenting a first and a second electronic device, from the plurality of electronic devices, into a same cluster based on a shared common characteristic;

determining a relative position and relative orientation of the first and the second electronic devices with respect to a base station, wherein the relative position is determined based on an analysis of a line of sight (LOS) of a wireless signal received by the first and the second electronic devices from the base station, and the relative orientation is determined based on an analysis of angles of arrival of the LOS wireless signal received at the first and the second electronic devices from the base station;

determining relative orientation between the first and the second electronic devices based on the determined relative position and the relative orientation of the first and the second electronic devices with respect to the base station; and rendering a virtual object anchored to one of the first or second electronic devices based on the determined relative orientation between the first and the second electronic devices.

2. The method of claim 1, wherein determining the relative orientation between the first and the second electronic devices further comprises performing a triangulation calculation that utilizes the determined relative position and the relative orientation of the first and the second electronic devices with respect to the base station.

3. The method of claim 1, wherein segmenting the first and the second electronic devices, from the plurality of electronic devices, into the same cluster based on a shared common characteristic further comprises:

transmitting a packet to the first and the second electronic devices;

receiving a channel state information (CSI) CSI matrix, at the base station, from the first and the second electronic devices;

embedding, at the base station, the received CSI matrices received from the first and the second electronic devices; and generating a unique space segmentation signature for each of the first and the second electronic devices, wherein each unique space segmentation signature is based on their respective embedded CSI matrices.

4. The method of claim 3, further comprising:

comparing the unique space segmentation signature of the first electronic device with the unique space segmentation signature of the second electronic device; and in response to determining, based on the comparison, that first electronic device is within a predetermined distance of the second electronic device, segmenting the first and the second electronic devices into the same cluster.

5. The method of claim 3, wherein the CSI matrix received at the base station from the first and the second electronic devices provides a state of channel that is specific to the electronic device from which the CSI matrix is received.

6. The method of claim 3, wherein the CSI matrix received at the base station provides values relating to a wireless parameter that are specific to the electronic device, from the first and the second electronic devices, from which the base station receives the CSI matrix.

7. The method of claim 1, wherein determining the relative position of each of the segmented electronic devices based on the analysis of the LOS wireless signal further comprises determining whether the wireless signal received by the first and the second electronic devices is an LOS or a non-line of sight (nLOS) nLOS wireless signal.

8. The method of claim 1, wherein determining the relative orientation of each of the segmented electronic devices based on the analysis of the LOS wireless signal further comprises:

detecting a wireless signal received by an electronic device, from the plurality of electronic devices; and determining whether the received wireless signal is an LOS or a non-line of sight (nLOS) wireless signal.

9. The method of claim 8, further comprising, in response to determining that the wireless signal is an LOS wireless signal:

selecting a base station as a stationary reference point; and determining orientation of the electronic device based on the selected stationary reference point.

10. The method of claim 1, further comprising updating the determined relative orientation of each of the segmented electronic devices that are clustered together based on the shared common characteristic.

11. The method of claim 10, wherein the updating comprises:

exchanging a hello packet between the first and the second electronic devices;

determining an angle of arrival of the hello packet; and determining relative orientation between the first and the second electronic devices based on the determined angle of arrival of the hello packet.

12. A system for determining relative orientation between electronic devices in a mixed reality (MR) environment comprising:

communications circuitry configured to access a plurality of electronic devices, wherein each electronic device is associated with a different user;

control circuitry configured to:

detect engagement of the plurality of electronic devices with a multi-user MR environment;

segment a first and a second electronic device, from the plurality of electronic devices, into a same cluster based on a shared common characteristic;

determine a relative position and relative orientation of the first and the second electronic devices with respect to a base station, wherein the relative position is determined based on an analysis of a line of sight (LOS) of a wireless signal received by the first and the second electronic devices from the base station, and the relative orientation is determined based on an analysis of angles of arrival of the LOS wireless signal received at the first and the second electronic devices from the base station;

determine relative orientation between the first and the second electronic devices based on the determined relative position and the relative orientation of the first and the second electronic devices with respect to the base station; and render a virtual object anchored to one of the first or second electronic devices based on the determined relative orientation between the first and the second electronic devices.

13. The system of claim 12, wherein determining the relative orientation between the first and the second electronic devices further comprises, the control circuitry configured to perform a triangulation calculation that utilizes the determined relative position and relative orientation of the first and the second electronic devices with respect to the base station.

14. The system of claim 12, wherein segmenting the first and the second electronic devices, from the plurality of electronic devices, into the same cluster based on a shared common characteristic further comprises, the control circuitry configured to:

transmit a packet to the first and the second electronic devices;

receive a channel state information (CSI) matrix, at the base station, from the first and the second electronic devices;

embed, at the base station, the received CSI matrices received from the first and the second electronic devices; and generate a unique space segmentation signature for each of the first and the second electronic devices, wherein each unique space segmentation signature is based on their respective embedded CSI matrices.

15. The system of claim 14, further comprising, the control circuitry configured to:

compare the unique space segmentation signature of the first electronic device with the unique space segmentation signature of the second electronic device; and in response to determining, based on the comparison, that first electronic device is within a predetermined distance of the second electronic device, segment the first and the second electronic devices into the same cluster.

16. The system of claim 14, wherein the CSI matrix received at the base station from the first and the second electronic devices provides a state of channel that is specific to the electronic device from which the CSI matrix is received.

17. The system of claim 14, wherein the CSI matrix received at the base station provides values relating to a wireless parameter that are specific to the electronic device, from the first and the second electronic devices, from which the base station receives the CSI matrix.

18. The system of claim 12, wherein determining the relative position of each of the segmented electronic devices based on the analysis of the LOS wireless signal further comprises, the control circuitry configured to determine whether the wireless signal received by the first and the second electronic devices is an LOS or a non-line of sight (nLOS) nLOS wireless signal.

19. The system of claim 12, wherein determining a relative orientation of each of the segmented electronic devices based on the analysis of the LOS wireless signal further comprises, the control circuitry configured to:

detect a wireless signal received by an electronic device, from the plurality of electronic devices; and determine whether the received wireless signal is an LOS or a non-line of sight (nLOS) wireless signal.

20. The system of claim 19, further comprising, in response to determining that the wireless signal is an LOS wireless signal, the control circuitry configured to:

select a base station as a stationary reference point; and determine orientation of the electronic device based on the selected stationary reference point.

\* \* \* \* \*